US008393884B2

(12) United States Patent
Kimura

(10) Patent No.: US 8,393,884 B2

(45) Date of Patent: *Mar. 12, 2013

(54) EJECTOR DEVICE OF INJECTION MOLDING MACHINE

(75) Inventor: Seiji Kimura, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 267 days.

This patent is subject to a terminal disclaimer.

(21) Appl. No.: 12/924,575

(22) Filed: Sep. 30, 2010

(65) Prior Publication Data

US 2011/0311665 A1 Dec. 22, 2011

Related U.S. Application Data

(63) Continuation-in-part of application No. 12/803,217, filed on Jun. 22, 2010.

(51) Int. Cl.
*B29C 45/40* (2006.01)

(52) U.S. Cl. ............. 425/3; 425/443; 425/556; 264/334

(58) Field of Classification Search ....... 425/3, DIG. 33, 425/443, 556; 264/334, 336

See application file for complete search history.

(56) References Cited

U.S. PATENT DOCUMENTS

| | | | | |
|---|---|---|---|---|
| 6,247,913 | B1 * | 6/2001 | Shibuya et al. | 425/145 |
| 6,346,209 | B1 * | 2/2002 | Messemer et al. | 425/443 |
| 6,371,436 | B1 * | 4/2002 | Westhoff et al. | 249/63 |
| 6,673,283 | B2 * | 1/2004 | Coel et al. | 264/40.5 |
| 7,910,161 | B2 * | 3/2011 | Nishimura et al. | 427/162 |
| 2011/0250305 | A1 * | 10/2011 | Moon et al. | 425/3 |

FOREIGN PATENT DOCUMENTS

| | | | |
|---|---|---|---|
| JP | 05-050475 | * | 3/1993 |
| JP | 5-245847 | | 9/1993 |
| JP | 2000-301580 | | 10/2000 |
| JP | 2004-106354 | * | 4/2001 |
| JP | 2005-254514 | | 9/2005 |
| JP | 2007-098957 | | 4/2007 |

* cited by examiner

*Primary Examiner* — Richard Crispino

*Assistant Examiner* — Thukhanh Nguyen

(74) *Attorney, Agent, or Firm* — Jordan and Hamburg LLP

(57) ABSTRACT

The ejector device of a molding machine includes: an ejector plate; an ejector drive means for driving the ejector plate in directions to approach towards and to withdraw from a platen; a plurality of rod insertion holes formed so as to pierce through the platen; and a plurality of ejector rods or a plurality of base rods which are base end portions of ejector rods that are inserted into the plurality of rod insertion holes so as to slide freely therein; and a plurality of magnetic rod fixing mechanisms capable of removably fixing the plurality of ejector rods to the ejector plate, or of removably fixing the plurality of detachable rods to the tip end portions of the base rods which are fixed to the ejector plate.

18 Claims, 20 Drawing Sheets

10
16A
28 29
28a
29x
3
14A
16c
16b
21
21
20
20
15f
15g
15h
26A
15Aa
11A
7A
15A
15c
12
12a
15b 10
3
11B
7B
14B
41
45
46
41
40
40
12

10
3
11C
32
7C
31a
32x
31
14C
45
41
41
40
40
12b
46
12

EJECTOR DEVICE OF INJECTION MOLDING MACHINE

This is a Continuation-in-Part of U.S. Ser. No. 12/803,217 filed Jun. 22, 2010.

TECHNICAL FIELD

The present invention relates to an ejector device of a molding machine, and in particular to one comprising a plurality of magnetic rod fixing means each of which is capable of fixing a portion or whole of the ejector rod to an ejector plate with magnetism of one or more permanent magnets in a detachable manner.

BACKGROUND OF THE INVENTION

In the prior art, with an injection molding machine, dies (a fixed die and a movable die) are attached to a fixed platen and to a movable platen, and the movable platen is driven in directions to approach towards the fixed platen and to be withdrawn therefrom, and thereby closing and opening of the dies are performed.

Synthetic resin in the molten state is supplied to a cavity within the dies that are closed together, and this synthetic resin in the molten state hardens so that a molded product is formed; and, after opening of the dies, this molded product is ejected from the mobable die by an ejector device.

In an ejector device of an injection molding machine, an ejector plate is disposed at the rear side of the movable platen, a plurality of ejector pins (i.e. ejector rods) are inserted through the movable platen so as to slide freely therein, and the base end portions of these ejector pins are fixed to the ejector plate. By the ejector plate being driven in the directions to approach the platen and to be withdrawn therefrom, the ejector pins are driven forwards and backwards between eject positions in which they are advanced and wait positions in which they are retracted.

A construction is known (for example, refer to Patent Document #1) in which the ejector pins are made as single continuous unitary type pins, with the base end portions of these ejector pins being fixed to the ejector plate and with the ejector pins piercing through the ejector plate and a retainer plate being engaged to the ejector plate from its rear side by a plurality of bolts, so that base end flange portions of the ejector pins are sandwiched between the ejector plate and the retainer plate; and also a construction is known (for example, refer to Patent Document #2) in which the base end portions of the ejector pins are engaged to the ejector plate by being screwed thereinto.

And, with regard to the ejector device of an injection molding machine described in Patent Document #3, an air cylinder is fixed to the ejector plate so as to face towards the platen, and base end flange portions of the ejector pin is linked via joint to the cylinder rod of the air cylinder. The base end flange portion of the ejector pin is engaged to concave portions of the joint in a manner so that their engagement can be released from directions orthogonal to the axis, and is fixed by a bolt so as not to rotate. The ejector pin can be exchanged by removing the bolt.

With regard to the ejector device of an injection molding machine described in Patent Document #4, each ejector pin includes tip end side ejector pin passing through a incorporated die that is assembled to the die, and a base end side ejector pin whose base end portion is fixed to the ejector plate, and the tip end side ejector pin is pressed and driven by the base end side ejector pin. In order to prevent operational faults due to thermal expansion of the embedded portion, the construction is adapted to permit some shifting of the tip end side ejector pin in directions orthogonal to the axis.

Patent Document #1: Japanese Laid-Open Patent Publication No. 5-245847; Patent Document #2: Japanese Laid-Open Patent Publication No. 2000-301580; Patent Document #3: Japanese Laid-Open Patent Publication No. 2007-98957; Patent Document #4: Japanese Laid-Open Patent Publication No. 2005-254514.

In regard to a conventional ejector device of the injection molding machine, when exchanging the die on the injection molding machine, sometimes it becomes necessary to exchange the ejector pins, in order to change the disposition the ejector pins to correspond to the new die (i.e. to the shape and size of new die). However, with a construction in which each ejector pin is made as a single continuous unitary type pin whose base end portions of the ejector pint is fixed to the ejector plate as in Patent Documents #1 and #2, the task of exchanging the ejector pins is heavy, the time and cost required for exchanging the ejector pins are also great and expensive.

In other words, regarding the ejector device described in Patent Document #1, the retainer plate must be removed from and fitted back to the ejector plate when exchanging the ejector pins, and due to this a plurality of bolts must be operated and the ejector pins must be removed and fitted from the rear side of the retainer plate, and this requires a lot of work and trouble.

Moreover, regarding the ejector device described in Patent Document #2, when exchanging the ejector pins, the ejector pins are rotated and the base end portions of the ejector pins are disengaged from and engaged to the ejector plate, and in particular, when engaging the base end portions of the ejector pins to the ejector plate, it is necessary to perform positioning of the base end screw portions of the ejector pins against the screw holes in the ejector plate and to exert a large force for rotating the ejector pins in this state, which imposes a great burden. Moreover there is a possibility that, at this time, the ejector plate may be damaged.

And, with regards to the ejector device described in Patent Document #3, the base end flange portion of the ejector pin is removably engaged to the concave portion of the joint that is linked to the air cylinder from directions orthogonal to the axis, and is fixed by a bolt being screwed tight therein, and it is possible to remove the bolt in order to exchange the ejector pin, but it is difficult to shift the base end flange portions of the ejector pin in the directions orthogonal to the axis in the state in which the ejector pin is passed through the platen, in other words to perform the linking to the joint and the release of such linking; and it is also quite absurd to provide a plurality of air cylinders that include air cylinders that are not used, in order to correspond to changes of configuration of the ejector pins.

And, in the case of a medium or large sized injection molding machine (some hundreds of tons class or one thousand and some hundreds of tons class), it often happens that the arrangement of the ejector pins must be changed when exchanging the die, so that the task of exchanging the ejector pins is required repeatedly. However, the lengths and the thicknesses of the ejector pins are great, and for example, with an injection molding machine of approximately 650 tons, the diameters of the ejection pins may be about 35 to 50 mm and their lengths may be about 1 m, so that the weight of the ejector pin also becomes great. Consequently, the burden of the task of exchanging the ejector pins becomes extremely great.

An object of the present invention is to provide an ejector device of a molding machine, which is capable of fixing a portion or whole of each ejector rod to the ejector plate by magnetism of one or more permanent magnets in a detachable manner, thereby makes it possible to reduce the burden and cost of the task of ejector rod exchange.

SUMMARY OF THE INVENTION

The ejector device of a molding machine of the present invention is a device for ejecting a molded product from a die fixed to a platen of the molding machine, and is characterized by comprising: an ejector plate disposed at a rear side of the platen; an ejector drive means for driving the ejector plate relatively to the platen in directions to approach towards and to withdraw from the platen; a plurality of rod insertion holes formed so as to pierce through the platen; a plurality of ejector rods that are inserted into the plurality of rod insertion holes so as to slide freely therein; and a plurality of magnetic rod fixing means for removably fixing the plurality of ejector rods to the ejector plate respectively by the magnetism of permanent magnets.

And, according to another aspect of the present invention, the device is characterized by comprising: a plurality of ejector rods, comprising a plurality of base rods that are inserted into the plurality of rod insertion holes so as to slide freely therein and whose base end portions are fixed to the ejector plate, and a plurality of detachable rods each of which can be fitted to and detached from a tip end portion of one of the plurality of base rods; and a plurality of magnetic rod fixing means for removably fixing the plurality of detachable rods to tip end portions of the base rods respectively by the magnetism of permanent magnets.

In the ejector device of a molding machine of the present invention, when the dies on the molding machine are exchanged, and when removing unnecessary ejector rods from the ejector plate on the basis of the new dies, in the state in which the ejector plate is put into its ejection position, it is possible to remove these ejector rods via the magnetic rod fixing means efficiently and in a simple manner from the die fixing surface side of the platen. Moreover, when installing ejector rods that are newly required to the ejector plate, in the state in which the ejector plate is put into its ejection position, it is possible to install these ejector rods via the magnetic rod fixing means efficiently and in a simple manner from the die fixing surface side of the platen.

In an ejector device of a molding machine according to another aspect of the present invention, each of the ejector rods has a base rod that is fixed to the ejector plate, and a detachable rod that can be fitted to and removed from the tip end portion of the base rod. When the dies on the molding machine are exchanged, and when removing unnecessary detachable rods from the ejector plate on the basis of the new dies, in the state in which the ejector plate is put into its ejection position, it is possible to remove these detachable rods via the magnetic rod fixing means efficiently and in a simple manner from the die fixing surface side of the platen.

Furthermore, when installing ejector rods that are newly required to the base rods, in the state in which the ejector plate is put into its ejection position, it is possible to install these detachable rods via the magnetic rod fixing means efficiently and in a simple manner from the die fixing surface side of the platen.

DESCRIPTION OF THE PREFERRED EMBODIMENTS

Figure 1:
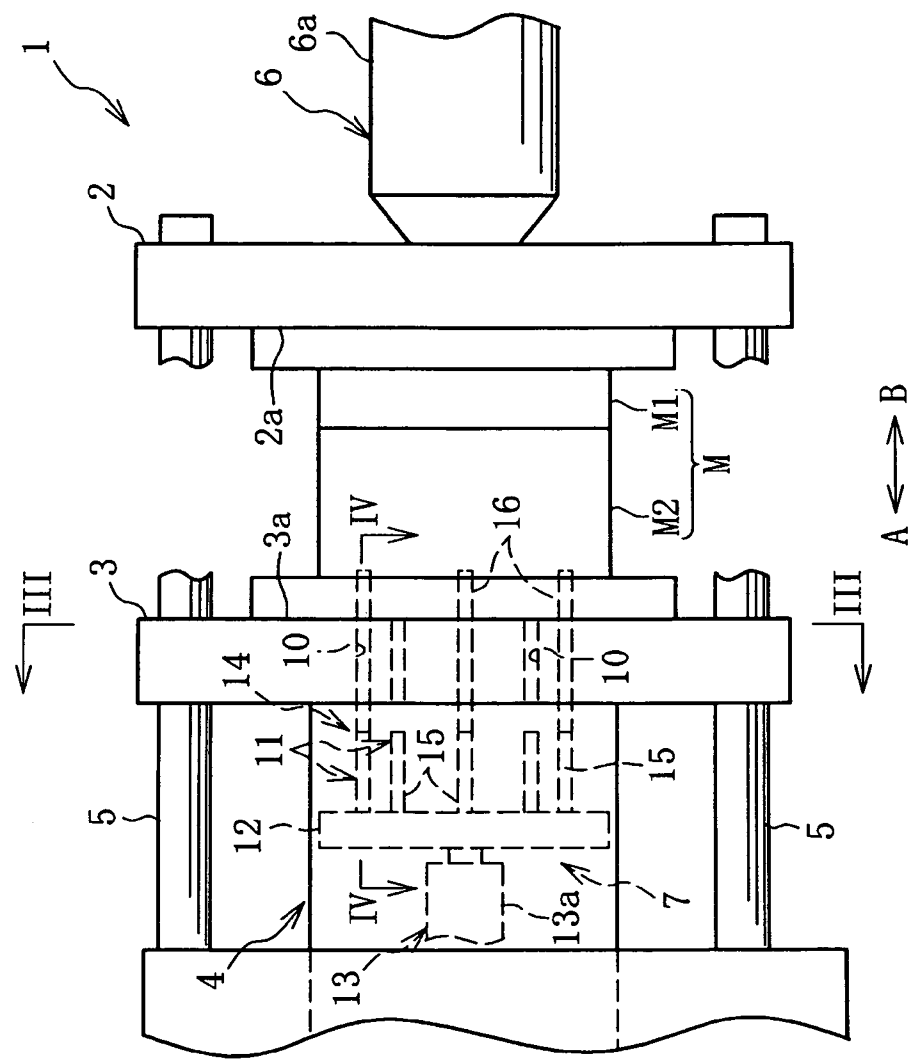
FIG. 1 is an elevation view of an injection molding machine having an ejector device and dies (closed state) according to Embodiment 1.
Figure 2:
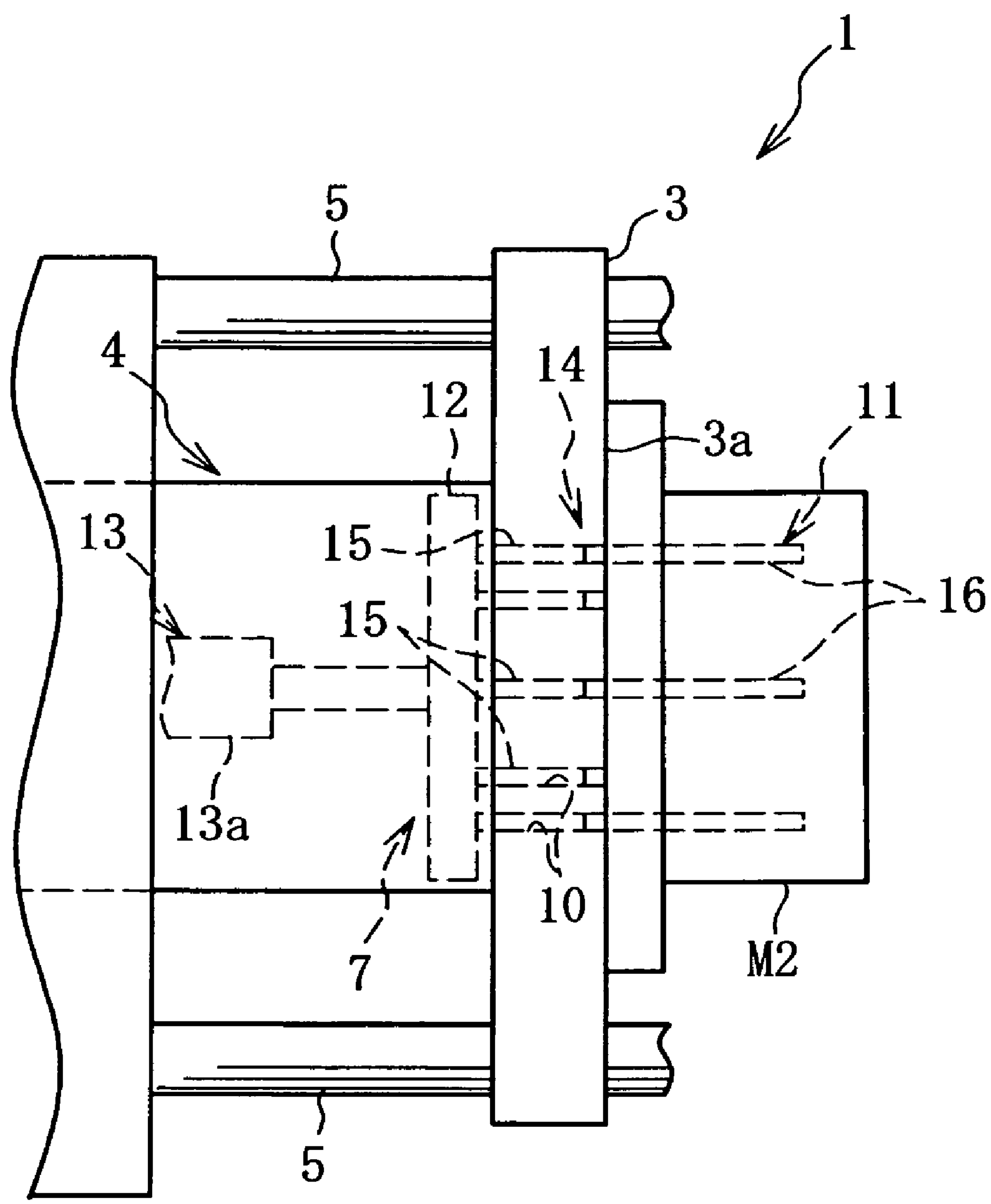
FIG. 2 is an elevation view of the essential portion of the injection molding machine and the die (opened state)
Figure 3:
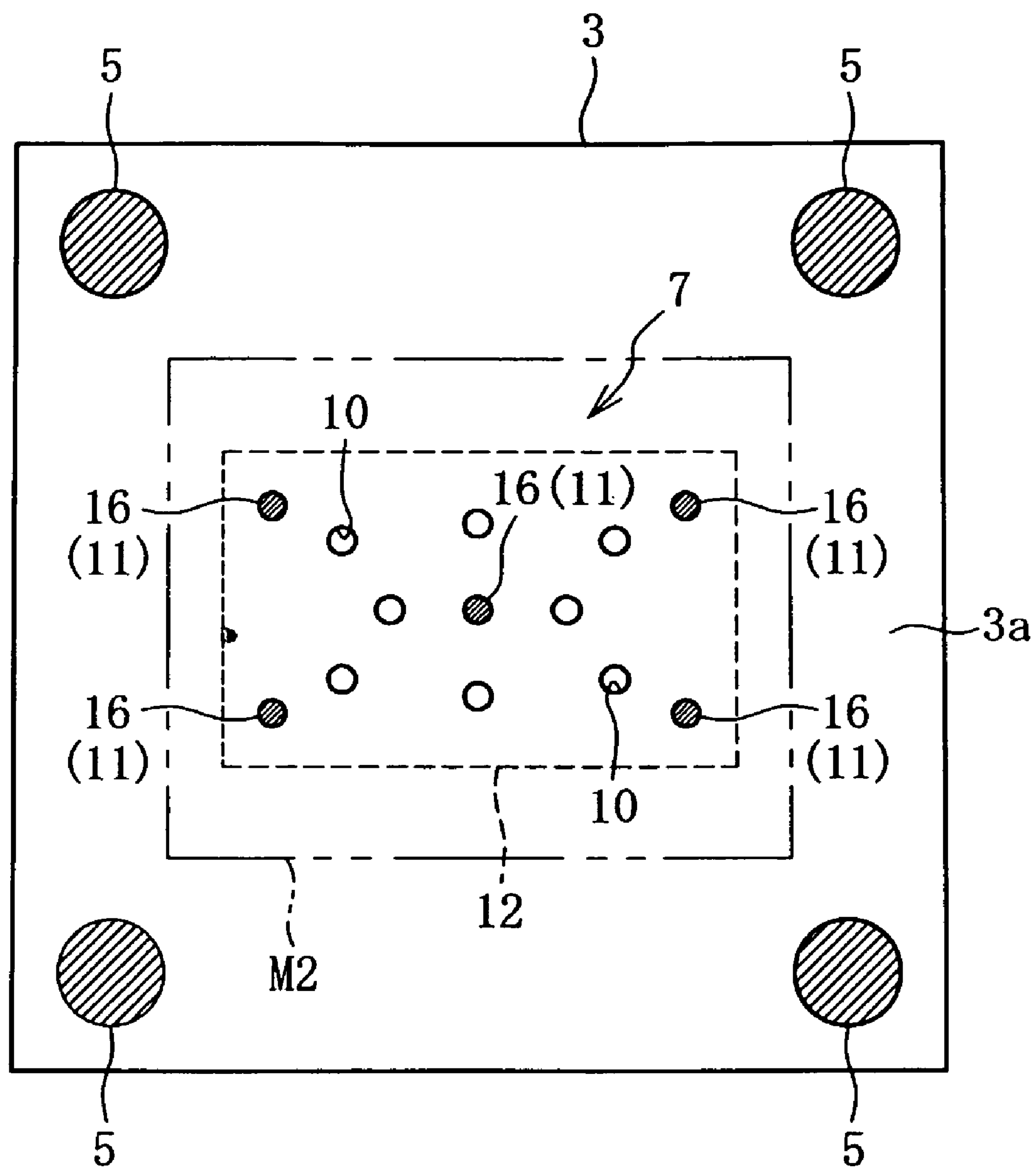
FIG. 3 is a sectional view along III-III line of FIG. 1.

As shown in FIGS. 1 to 3, an injection molding machine 1 comprises: a pair of platens 2, 3 (a fixed platen 2 and a movable platen 3) that face one another and to which a set of dies M (a fixed die M1 and a movable die M2) is fixed; a platen drive mechanism 4 including a hydraulic cylinder (or a drive motor) for driving the movable platen 3 in directions to approach to or withdraw from the fixed platen 2 when closing or opening of the dies M, four guide rods 5 that support the movable platen 3 and guide it so that it can shift freely in the above approach and withdrawal directions; an injection mechanism 6 including an injection barrel 6*a* for supplying synthetic resin in the molten state to a cavity within the die M when it is closed; and an ejector device 7 for ejecting a molded product from the movable die M2.

The fixed die M1 is fixed by a plurality of mechanical clamp devices (not shown in Figs.) to a die fixing surface 2*a* of the fixed platen 2, and, in a similar manner, the movable die M2 is fixed by a plurality of mechanical clamp devices (not shown in Figs.) to a die fixing surface 3*a* of the movable platen 3. Dies of a plurality of types and of different sizes and shapes can be fitted to these die fixing surfaces 2*a* and 3*a*, and removed therefrom.

When injection molding is to be performed with this injection molding machine 1, the movable platen 3 is driven by the platen drive mechanism 4 in the direction to approach towards the fixed platen 2, and, as shown in FIG. 1, the movable die M2 is pressed against the fixed die M1 so that they are in the closed state, and, in this state, synthetic resin in the molten state is supplied from the end of the injection barrel 6*a* into the cavity within the die M, so that a molded product is formed. Thereafter, the movable platen 3 is driven by the platen drive mechanism 4 in the direction to withdraw from the fixed platen 2, and, as shown in FIG. 2, the movable die M2 is pulled away from the fixed die M1 so that they are in the opened apart state, and, in this state, the molded product is ejected from the movable die M2 by the ejector device 7.

Next, the details of the ejector device 7 will be described.

The reference numeral A in FIG. 1 denotes the leftward direction, while the reference numeral B denotes the rightward direction.

As shown in FIGS. 1 to 9, the ejector device 7 comprises a plurality of rod insertion holes 10 that are formed to pierce through the movable platen 3 in the right-to-left direction, a plurality of ejector rods 11 that extend in the right-to-left direction and are inserted into the plurality of rod insertion holes 10 respectively so as to slide freely therein, an ejector plate 12 that is disposed at the rear side of the movable platen 3 (i.e. at its left side), an ejector drive mechanism 13 for driving the ejector plate 12 with respect to the movable platen 3 in the right-to-left direction so that it approaches to and withdraws from the movable platen 3, and a plurality of magnetic rod fixing mechanisms 14 corresponding to the plurality of ejector rods 11 respectively.

The number of the plurality of rod insertion holes 10 and their arrangement, the diameters of these rod insertion holes 10, the number of the plurality of ejector rods 11 and their arrangement, the lengths and the diameters of these ejector rods 11, and the size of the ejector plate 12 and so on, are set on the basis of the various types of dies that are expected to be used with the injection molding machine 1. The ejector drive mechanism 13 has a fluid pressure cylinder 13*a*. By the ejector plate 12 being driven by this ejector drive mechanism 13 in the right-to -left direction with respect to the movable platen 3, the ejector rods 11 are driven forwards and backwards between eject positions in which they are advanced (refer to FIG. 2) and wait positions in which they are retracted (refer to FIG. 1).

Each of ejector rods 11 comprises a base rod 15 made from a magnetic material (for example, steel) that is inserted into the rod insertion hole 10 so as to slide freely therein and whose base end portion is fixed to the ejector plate 12, and a detachable rod 16 made from a magnetic material (for example, steel) that can be fitted to and detached from the tip end portion of the base rod 15. It is so arranged that, when the ejector rods 11 are in their eject positions, the tip end portions of the base rods 15 to be located at positions that are towards the movable platen 3 (i.e. towards the left side) than the movable die M2 (refer to FIG. 2), that is, the tip ends of the base rods 15 are located within the rod insertion holes 10.

Figure 4:
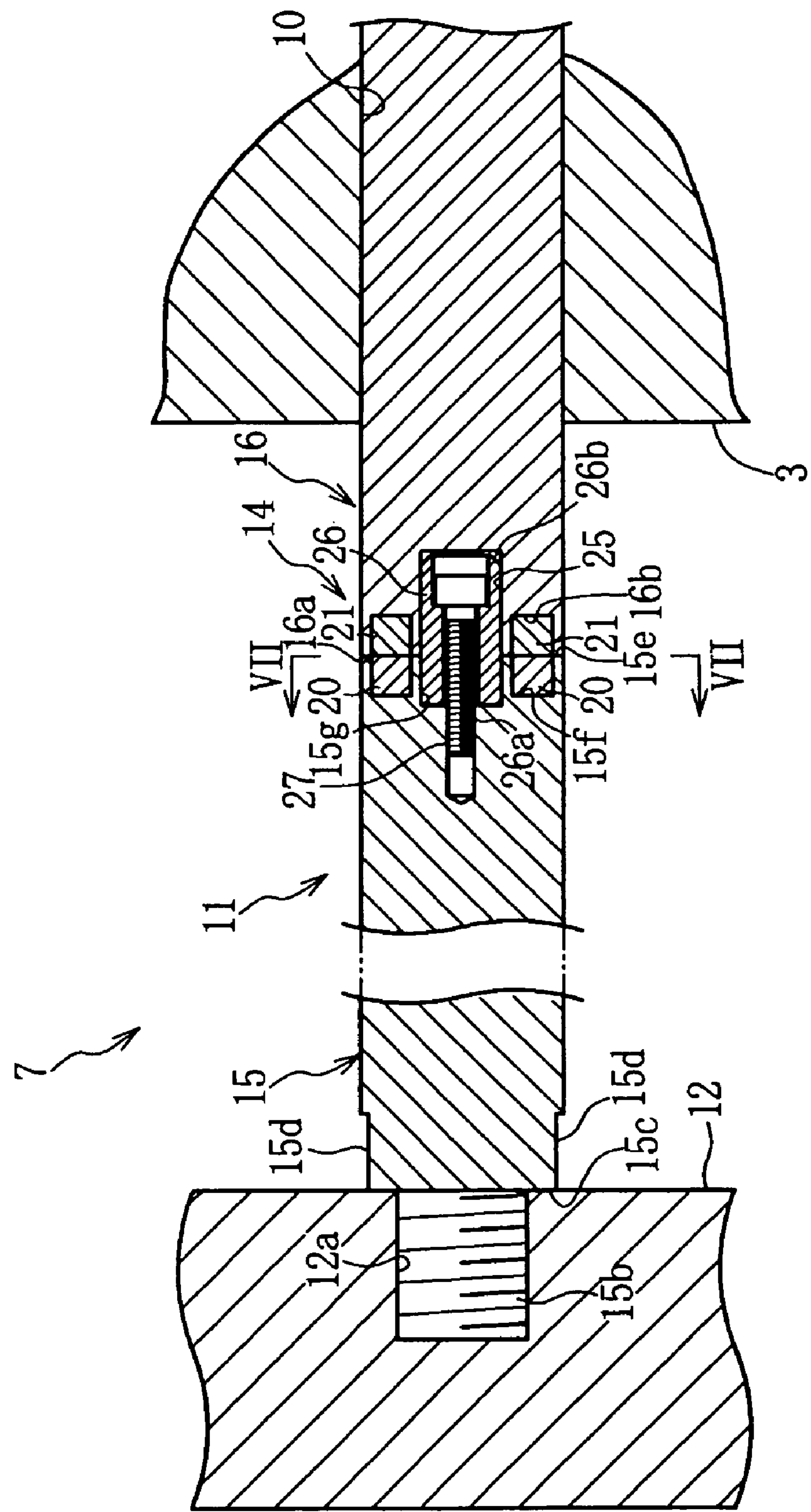
FIG. 4 is a sectional view along IV-IV line of FIG. 1.

As shown in FIG. 4, at the base end portion (i.e. the left end portion) of each of the base rods 15, a threaded shaft 15*b* is formed that is of smaller diameter than the main body of the base rod 15, and this screw shaft 15*b* is screwed into a threaded hole 12*a* formed in the ejector plate 12 and is thereby engaged therewith, with a step portion 15*c* defined at the boundary between the rod main body and the screw shaft 15*b* being pressed against the ejector plate 12, so that thereby the base end portion of the base rod 15 is screwed fixedly into the ejector plate 12. In order to rotate the base rod 15, a pair of flattened engagement surfaces 15*d*, to which a tool such as a wrench or the like may be engaged, are formed on the external circumferential surface of the base rod 15.

Plural sets of detachable rods 16 having different lengths are provided based on plural types of the dies M that are expected to be used with the injection molding machine 1. For example, for each rod insertion hole 10, one detachable rod 16 may be provided, or a plurality thereof having different lengths may be provided.

As shown in FIGS. 4 to 9, the magnetic rod fixing mechanism 14 is a system for attracting the base end portion (i.e. the left end portion) of the detachable rod 16 to the tip end portion (i.e. the right end portion) of corresponding base rod 15 by magnetism, and the magnetic rod fixing mechanism 14 comprises a plurality of first magnets 20 (for example, four thereof) that are provided at the tip end portion of the base rod 15, and a plurality of second magnets 21 (for example, four thereof) that are provided at the base end portion of the detachable rod 16. Both the tip end surface 15*e* of the base rod 15 and the base end surface 16*a* of the detachable rod 16 are formed as smooth vertical surfaces, and these surfaces 15*e*, 16*a* can be mutually contacted together and can be fixed in a stable state by the magnetism. The number of the first magnets 20 is an even number, and the number of the second magnets 21 is an even number equal to above even number of the first magnets 20. For example, the magnets 20, 21 may be neodymium magnets.

Figure 5:
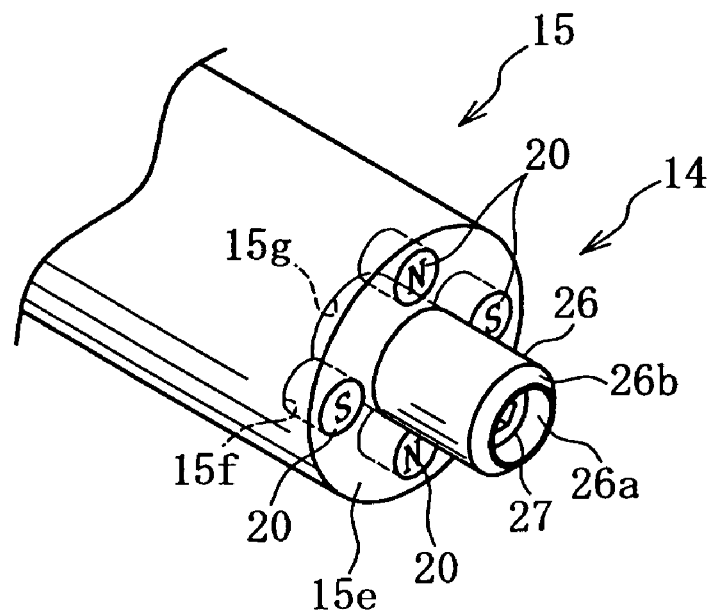
FIG. 5 is a perspective view of the tip end portion of a base rod.

As shown in FIGS. 4, 5, the plurality of first magnets 20 are fitted on the tip end portion of the base rod 15, at radially outward positions from its central portion and at regular intervals around its circumferential direction (for example, interval of 90°), and are arranged so that the magnetic poles of neighboring ones in the circumferential direction of these magnets 20 are opposite. Each of these first magnets 20 is formed in the shape of a circular cylinder, and is quite short in length and has a diameter approximately ¼ of the diameter of its base rod 15. These plurality of first magnets 20 are fitted into magnet fitting apertures 15*f* formed in the base rod 15 and are fixed thereinto by adhesive, so that their tip end surfaces face out onto the tip end surface 15*e* of the base rod 15. Each of the first magnets 20 is disposed so that the direction defined by the N pole and the S pole is parallel with the axis of the ejector rod 11, and multiple first magnets 20 are disposed so that the N poles and S poles locate alternately on the tip end of the base rod 15 around the circumferential direction.

Figure 6:
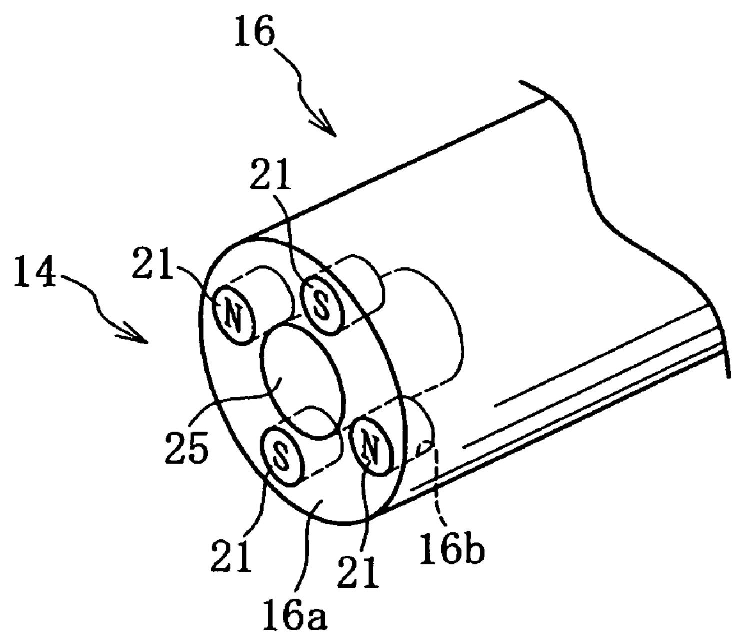
FIG. 6 is a perspective view of the base end portion of a detachable rod.
Figure 7:
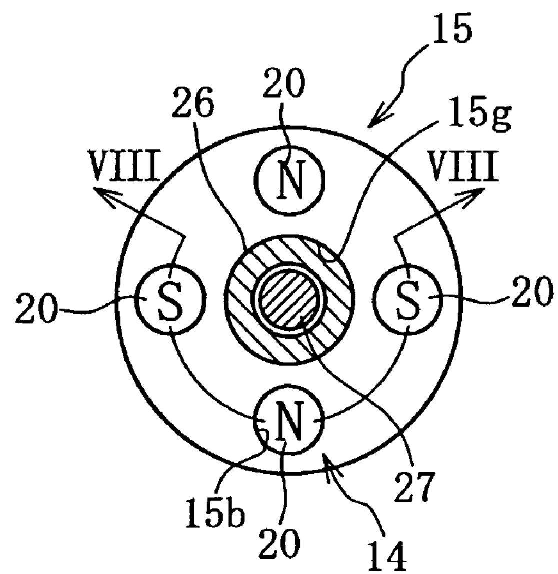
FIG. 7 is a sectional view along VII-VII line of FIG. 4.

As shown in FIGS. 4, 6, in a similar manner, the plurality of second magnets 21 are fitted on the base end portion of the detachable rod 16, at radially outward positions from its central portion and at regular intervals around its circumferential direction (for example, interval of 90°), and are arranged so that the magnetic poles of neighboring ones in the circumferential direction of these second magnets 21 are opposite. Each of these second magnets 21 is formed in the shape of a circular cylinder, and is quite short in length and has a diameter approximately ¼ of the diameter of its detachable rod 16. These plurality of second magnets 21 are fitted into magnet fitting apertures 16*b* formed in the detachable rod 16 and are fixed thereinto by adhesive, so that their base end surfaces face out onto the base end surface 16*a* of the detachable rod 16. Each of the second magnets 21 is disposed so that the direction defined by the N pole and the S pole is parallel with the axis of the ejector rod 11, and multiple second magnets 21 are disposed so that the N poles and S poles locate alternately on the tip end of the base rod 15 around the circumferential direction.

Figure 8:
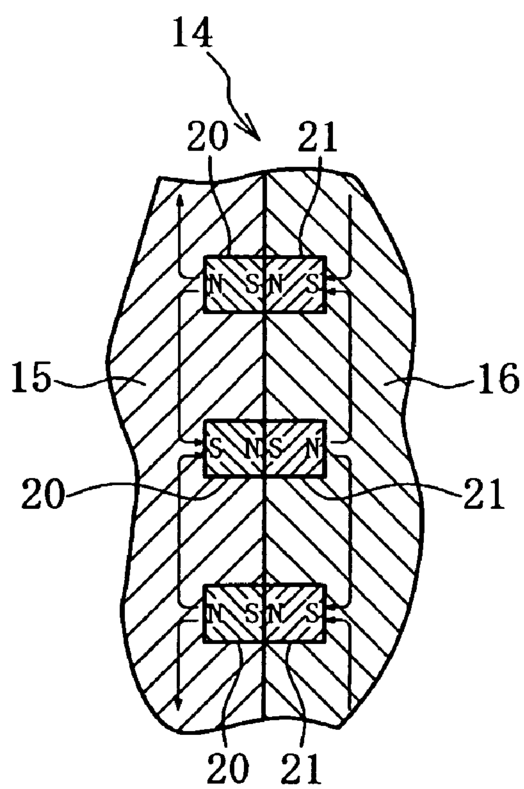
FIG. 8 is a sectional view along VIII-VIII line of FIG. 7, showing the state in which the base rod and the detachable rod are attracted together.
Figure 9:
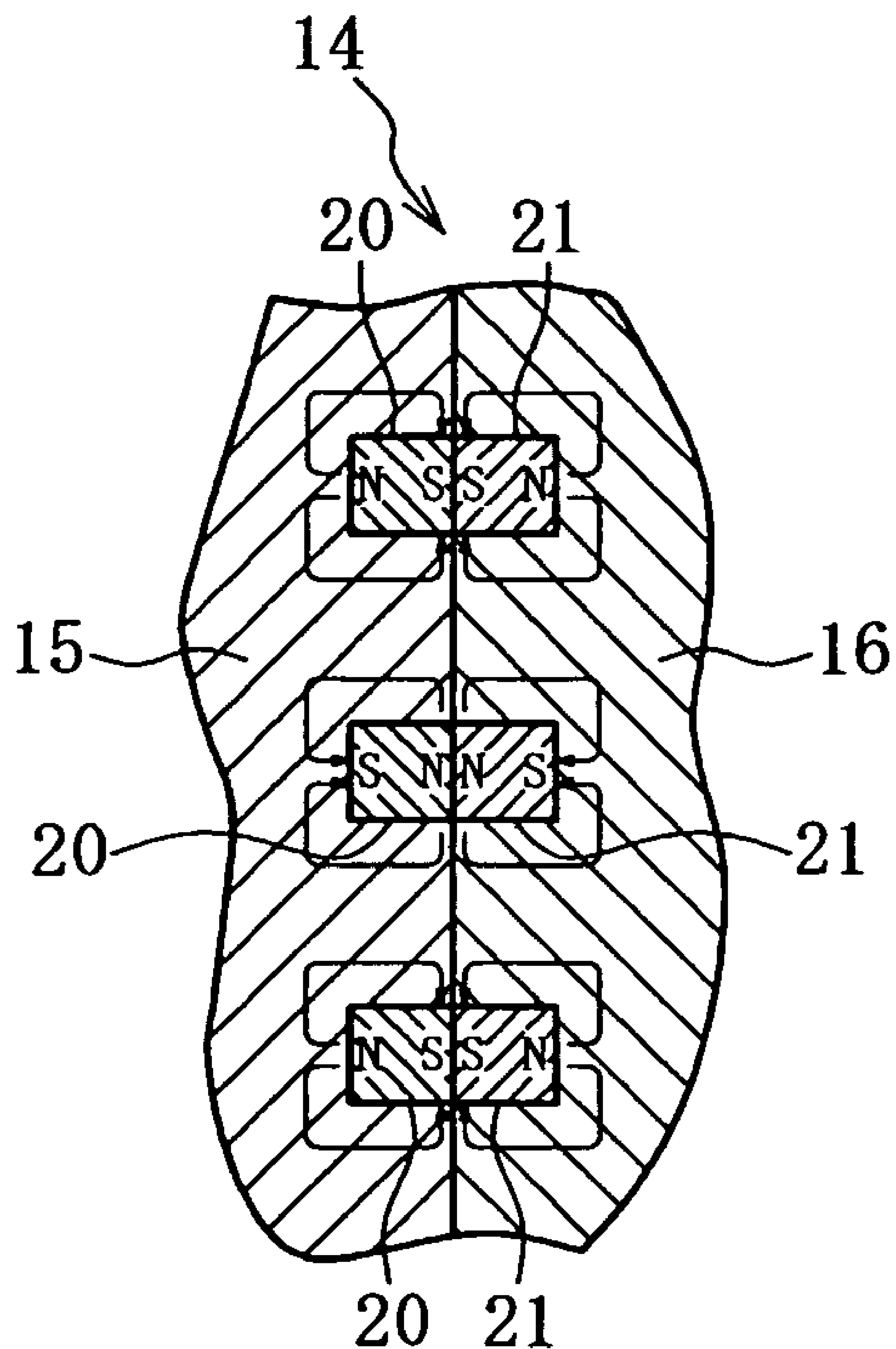
FIG. 9 is a sectional view corresponding to FIG. 8, showing the state in which the base rod and the detachable rod are not attracted together.
Figure 10:
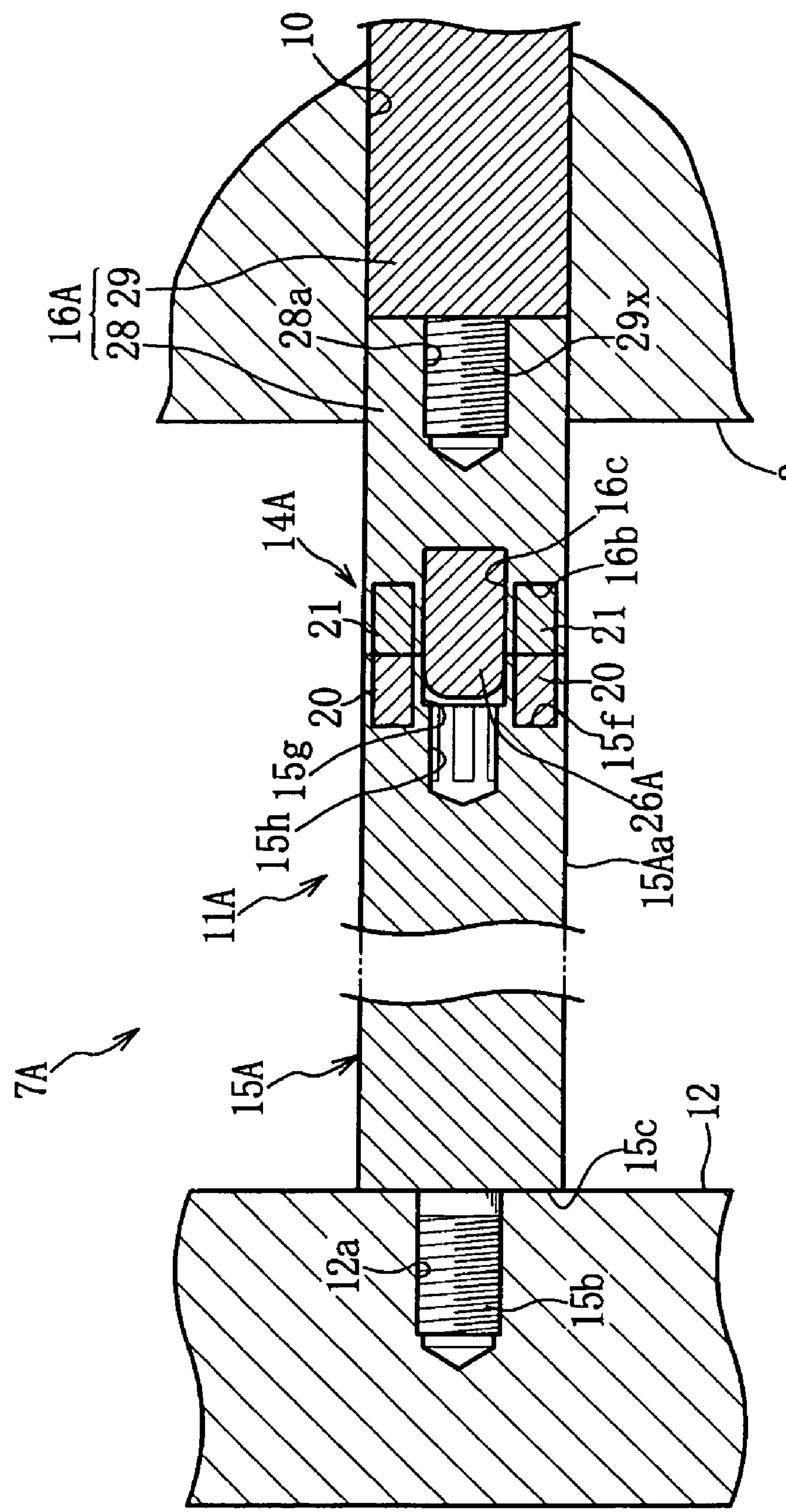
FIG. 10 is a drawing corresponding to FIG. 4, for an injection molding machine of Embodiment 2.
Figure 11:
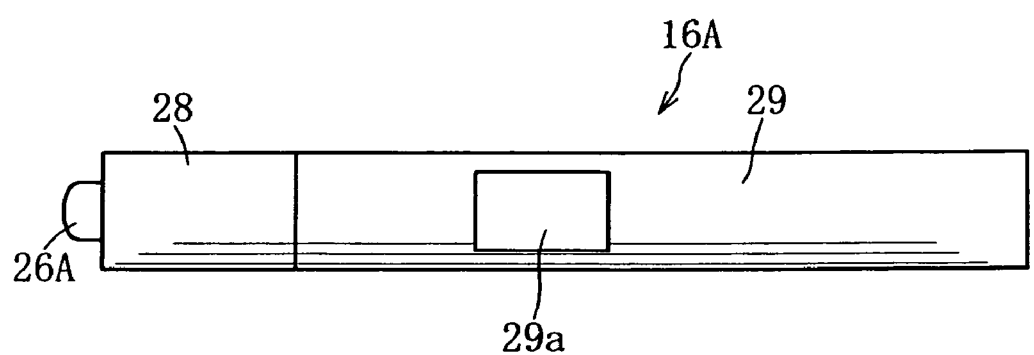
FIG. 11 is an elevation view of a detachable rod.
Figure 12:
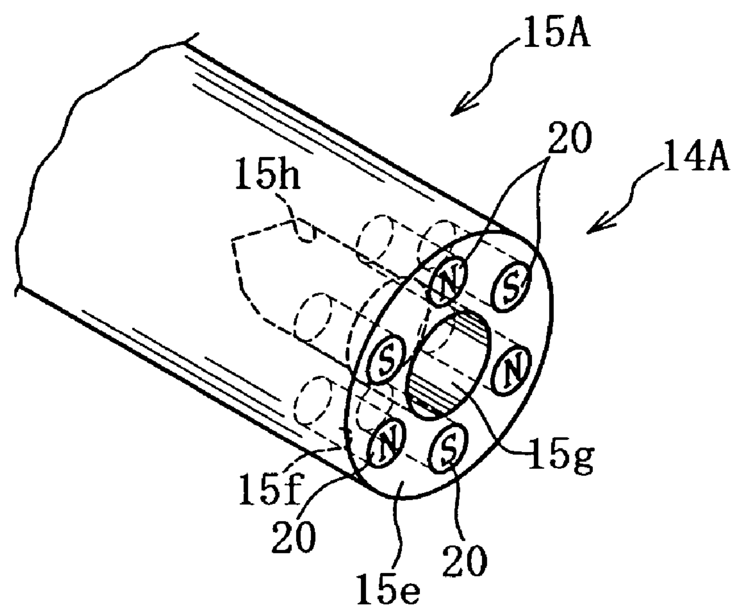
FIG. 12 is a perspective view of the tip end portion of a base rod.
Figure 13:
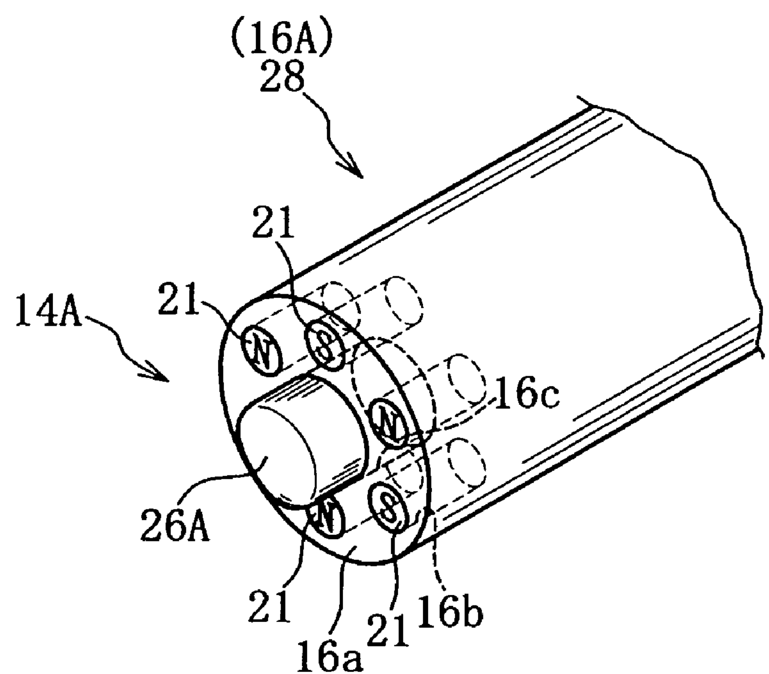
FIG. 13 is a perspective view of the base end portion, of the detachable rod.

And, as shown in FIG. 8, by providing the pluralities of first and second magnets 20, 21 to the magnetic rod fixing mechanism 14, the base end portion of the detachable rod 16 sticks to the tip end portion of the base rod 15 by coinciding the positions around the circumferential direction of first and second magnets 20, 21 whose magnetic poles are opposite (i.e. N pole and S pole); and moreover when, from this state, by rotating the detachable rod 16 by approximately 90° relatively to the base rod 15, these magnetic poles facing each other become the same, then it is possible to remove the detachable rod 16 from the base rod 15 by taking advantage of the forces of repulsion between the first and second magnets 20, 21.

In other words, as shown in FIG. 8, in the state in which the positions around the circumferential direction of first and second magnets 20, 21 whose magnetic poles are opposite agree with one another, then the sticking force becomes maximum because the magnetic path due to four sets of first and second magnets 20, 21 neighboring one another around the circumferential direction becomes the magnetic path shown by the arrow signs in FIG. 8. And when the detachable rod 16 is rotated by 90° from this state, then the repulsive force becomes maximum because the magnetic path due to four sets of the first and second magnets 20, 21 becomes the magnetic path shown by the arrow signs in FIG. 9, so that the sticking force is annulled.

As shown in FIGS. 4, 6, an engagement hole 25 is formed in the central portion of the base end portion of the detachable rods 16, and an engagement pin 26 that is made from a non-magnetic material (for example, stainless steel) is fixedly attached to the central portion of the tip end portion of the base rods 15 so as to project rightwards and to engage into the engagement hole 25. The engagement pin 26 is provided in order to make the axis of the detachable rod 16 coincide with the axis of base rod 15.

The base end portion of this engagement pin 26 is fitted into a pin fitting concave portion 15*g* formed in the base rod 15. For this, a bolt 27 is inserted into a stepped hole 26*a* formed in the engagement pin 26, and the bolt 27 is screwed fixedly to the base rod 15, in the state in which its head portion is engaged into the step portion of the stepped hole 26*a*. A tapered portion 26*b* is formed on the external circumferential portion of the tip end of the engagement pin 26, so that the engagement pin 26 can be smoothly inserted into the engagement hole 25 of the detachable rod 16.

Next, the operation of the ejector device 7 of the injection molding machine 1 explained above and its advantages, will be described.

Since, along with comprising the plurality of rod insertion holes 10, the plurality of ejector rods 11, the ejector plate 12, and the ejector drive mechanism 13, the ejector device 7 also, in particular, comprises the plurality of magnetic rod fixing mechanisms 14 each of which generates magnetism for fixing the detachable rod 16, that is a portion of the ejector rod 11, to the tip end of the base rod 15 in a detachable manner which is fixed to the ejector plate 12, accordingly it is possible to fit and remove the detachable rods 16 to the ejector plate 12 via the base rod 15 from the die fixing surface side 3*a* of the movable platen 3 in a simple and easy manner.

Accordingly, one or more ejector rods 11 are elected based on the dies M to be used for forming the next molded product, and one or more detachable rods 16 are fitted only to one or more base rods corresponding to above described one or more selected ejector rods 11.

Accordingly, it becomes possible to exchange the ejector rods 11 (i.e. the detachable rods 16) in a simple manner when the dies M is exchanged, by removing unnecessary detachable rods 16 from their base rods 15 and also by installing newly required detachable rods 16 to their base rods 15 from the die fixing surface side 3*a* of the movable platen 3, in correspondence to the new dies. At this time, in order to exchange the ejector rod 11, it is necessary to exchange the detachable rod 16 only, without exchanging whole of the ejector rod 11. In other words, when exchanging the dies M, it is possible greatly to reduce the burden of the task of exchanging the ejector rods 11, and consequently it is possible greatly to reduce the time and the cost required for exchanging the ejector rods 11.

Since the base end portions of the base rods 15 are screwed fixedly to the ejector plate 15, accordingly it is possible to simplify the construction for fixing the base end portions of the base rods 15 to the ejector plate 12. And since, when the ejector rods 11 are projected in their eject positions, it is arranged for the tip end portions of the base rods 15 to be positioned on the movable platen 3 side (i.e. within the rod insertion holes 10) than the movable die M2, accordingly it is possible to avoid the occurrence of the operational fault that the base rods 15 not being used interferes with the movable die 3.

The magnetic rod fixing mechanism 14 has a structure with which the base end portions of the detachable rods 16 can be made to stick to the tip end portions of the base rods 15 by setting the positions of the first and second magnets 20, 21 around the circumferential direction for opposite magnetic poles thereof to match one another; and, by rotating the detachable rods 16 respectively relatively to the base rods 15 from this state, it is possible to remove the detachable rods 16 from the base rods 15, thus taking advantage of the repulsive force of the first and second magnets 20, 21 whose matching magnetic poles are now the same.

In other words, when exchanging the detachable rods 16, in the rotational positions of the detachable rods 16 in which the positions in the circumferential direction of the first and second magnets 20, 21 agree with one another, it is possible reliably to stick the base end portions of the detachable rods 16 to the tip end portions of the base rods 15; and, moreover, by rotating the detachable rods 16 with respect to the base rods 15, it is possible to take advantage of the repulsive force of the first and second magnets 20, 21 whose magnetic poles are now the same, so as to remove the detachable rods 16 from the base rods 15 in a simple manner.

Due to the provision of the engagement holes 25 formed in the central portions of the base end portions of the detachable rods 16 and of the engagement pins 26 that are made from a non-magnetic material and are fitted to the central portions of the base end portions of the base rods 15 so as to project and to engage into engagement holes 25, and due to the function of positional determination by engagement holes 25 and engagement pins 26, and since it is possible to suppress the generation of any unnecessary sticking force due to magnetism between the engagement pins 26 and the detachable rods 16 because the engagement pins 26 are made from a non-magnetic material, accordingly it is possible reliably and smoothly to fit the detachable rods 16 to the base rods 15 from the die fixing surface side 3*a* of the movable platen 3 and to remove them therefrom; and furthermore, by the engagement holes 25 and the engagement pins 26 being engaged together, it is possible to prevent the tip end portions of the base rods 15 and the base end portions of the detachable rods 16 from coming away from one another.

Next, Embodiments 2 to 6 will be explained. Here, to structures or members that are substantially the same as in Embodiment 1, the same reference numerals will be appended, and in principle only different structures or members will be explained.

Embodiment 2

In the ejector device 7A of this second embodiment, the construction of the detachable rods 16A and the construction of the magnetic rod fixing mechanisms 14A are altered. As shown in FIGS. 10 to 13, each of the detachable rods 16A comprises a detachable rod base portions 28 that is made from a magnetic material (for example, steel), and a detachable rod residual portion 29 (detachable rod tip side portion 29) that is made from a light metallic material (for example, aluminum) and is fixed to a tip end portion of the detachable rod base portion 28.

In order to lighten the detachable rod 16A, the length of the detachable rod base portion 28 is a quite short predetermined length (for example, 50 to 100 mm). An axial screwed portion 29*x* of smaller diameter is formed at the base end portion of the detachable rod residual portion 29. And a threaded hole 28*a* is formed in the tip end portion of the detachable rod base portion 28. After adhesive has been applied to the tip end surface of the detachable rod base portion 28 and to the axial screwed portion 29*x* of the detachable rod residual portion 29, the detachable rod residual portion 29 is fixed to the detachable rod base portion 28 by screw engagement and adhesion, by the axial screwed portion 29*x* being screwed into the threaded hole 28*a* and thus being engaged thereinto. And a pair of flat portions 29*a* are formed at the midway portion in the lengthwise direction of the detachable rod residual portion 29. This is a structure that corresponds to a slippage prevention construction, that prevents slippage when the user grasps the detachable rod 16 by hand over this pair of flat portions 29*a*, and twists the rod 16.

A magnetic rod fixing mechanism 14A for fixing the base end portion of the detachable rod 16A to the tip end portion of the base rod 15A is fundamentally the same as the above described magnetic rod fixing mechanism 14, except for the aspect that the number of first and second magnets 20 and 21 is increased.

Six first magnets 20 are disposed on the tip end portion of the base rod 15A at regular intervals around its circumferential direction, with their N poles and S poles being positioned alternatingly around the circumferential direction of that tip end surface. And six second magnets 21 are disposed on the base end portion of the detachable rod base portion 28 of the detachable rod 16A at regular intervals around its circumferential direction, with their N poles and S poles being positioned alternatingly around the circumferential direction of that base end surface.

An engagement hole 15*g* is formed in the central portion of the tip end portion of the base rod 15A, and a hexagonal wrench aperture 15*h* is formed so as to extend from the bottom end of this engagement hole 15*g*. The base rod 15 can be fixed to the ejector plate 12 by engaging a hexagon wrench into the hexagon wrench aperture 15*h* and rotating the base rod 15. An engagement pin 26A made from a non-magnetic material (for example, stainless steel) is fixed to the central portion of the base end portion of the detachable rod base portion 28, so as to project into and engage with the engagement hole 15*g*. A base end portion of this engagement pin 26A is fitted into and adhered into a pin attachment concave portion 16*c* that is formed in the detachable rod base portion 28. A round shape is attached to the tip end portion of the engagement pin 25, so that the engagement pin 26A can be smoothly inserted into the engagement hole 15*g*. The operation and the advantages of the magnetic rod fixing mechanism 14A are the same as those of the magnetic rod fixing mechanism 14 previously described, and accordingly explanation thereof will be omitted.

Figure 14:
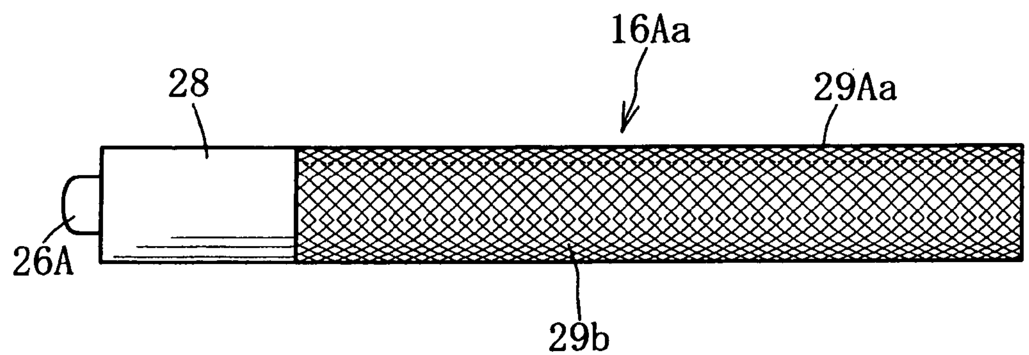
FIG. 14 is an elevation view of a modified detachable rod.

Here, it would also be acceptable to form knurling 29*b* on the outer circumferential surface of the detachable rod residual portion 29Aa of the detachable rod 16Aa, as shown in FIG. 14. This knurling 29*b* would correspond to a slippage prevention construction.

Figure 15:
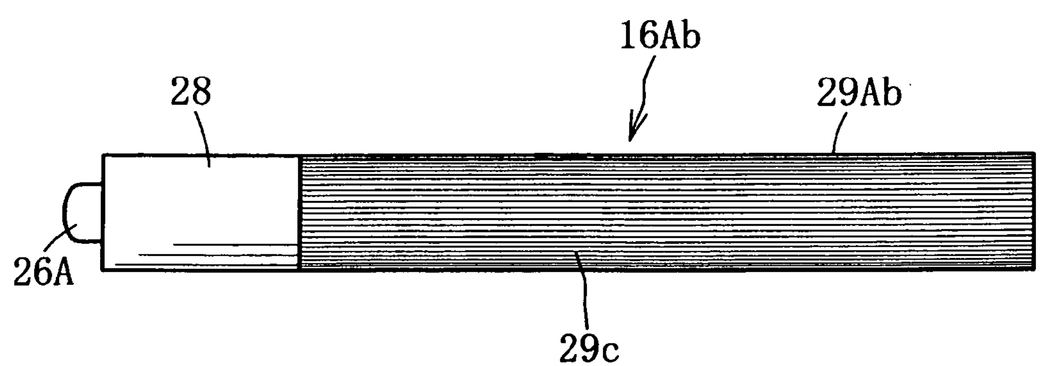
FIG. 15 is an elevation view of a modified detachable rod.

Furthermore, it would also be acceptable to form a plurality of spline grooves 29*c* on the outer circumferential surface of the detachable rod residual portion 29Ab of the detachable rod 16Ab, as shown in FIG. 15. These spline grooves 29*c* would also correspond to a slippage prevention construction.

Yet further, it would also be acceptable to make the above detachable rod residual portion 29, 29Aa, or 29Ab from some light metallic material other than aluminum (for example, from any of aluminum alloy, magnesium alloy, titanium, titanium alloy or the like).

Embodiment 3

Figure 16:
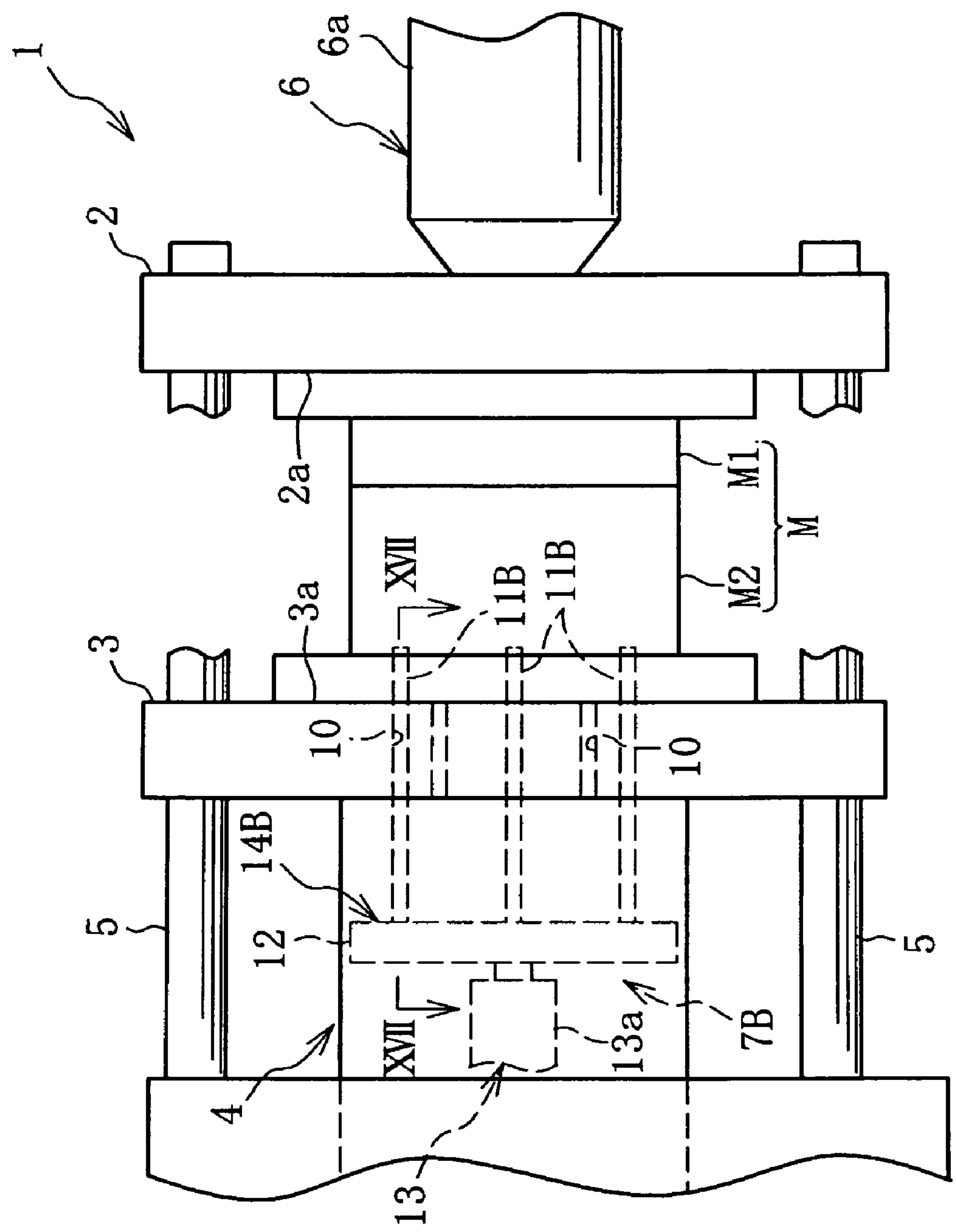
FIG. 16 is a drawing corresponding to FIG. 1, for an injection molding machine of Embodiment 3.
Figure 17:
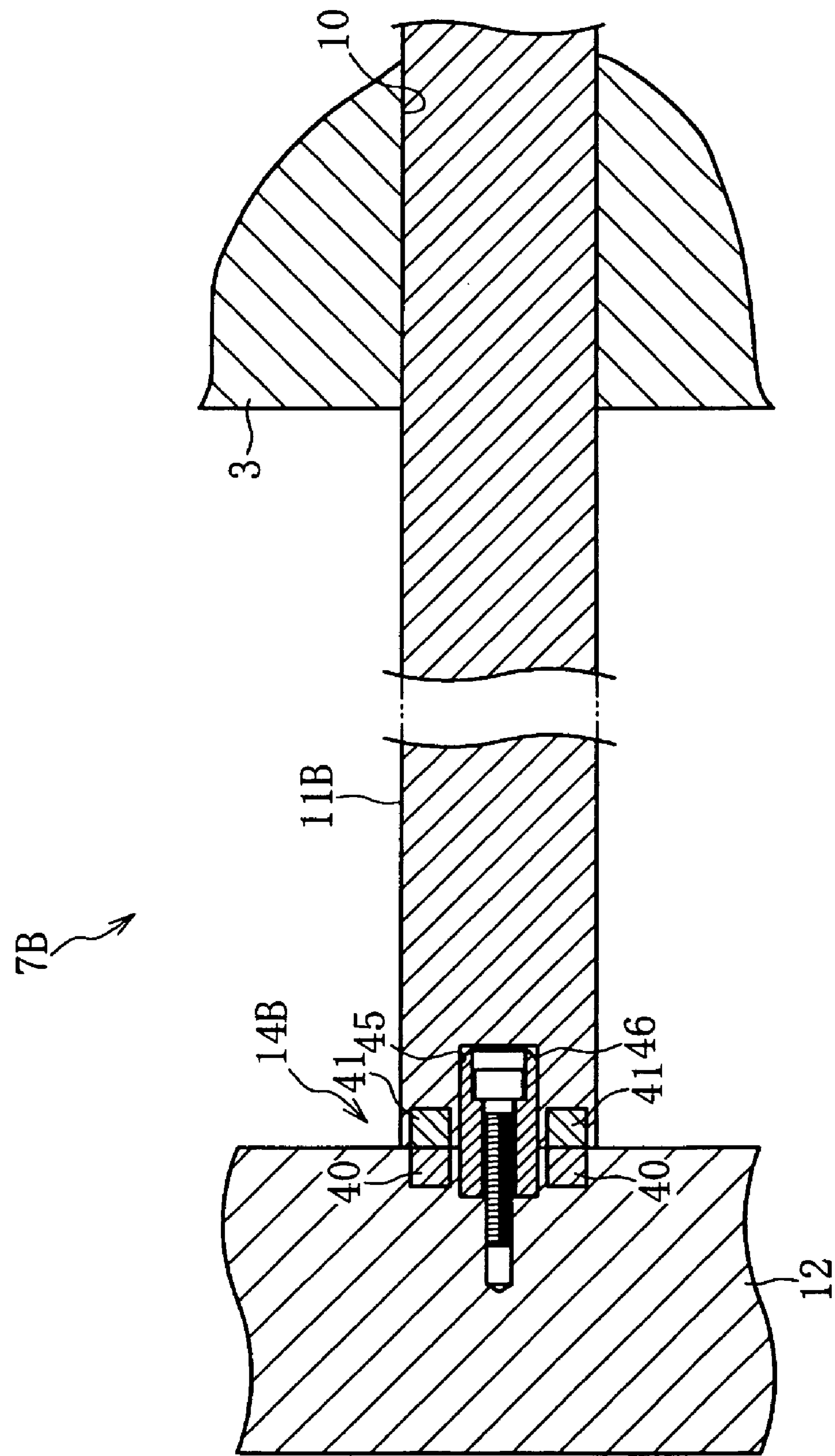
FIG. 17 is a drawing corresponding to FIG. 4, for the injection molding machine.

The ejector device 7B of Embodiment 3 is a version in which the ejector rods 11 and the magnetic rod fixing mechanisms 14 of Embodiment 1 has been changed. As shown in FIGS. 16 and 17, each of the plurality of ejector rods 11B is made as one continuous integral type ejector rod 11B from a magnetic material (for example, steel), and they are inserted into the plurality of rod insertion holes 10 respectively so as to slide freely therein. The ejector plate 12 also is made from a magnetic material (for example, steel).

The magnetic rod fixing mechanism 14B generate magnetism for fixing the integral type ejector rod 11B to the ejector plate 12. This magnetic rod fixing mechanism 14B has construction same as that of the magnetic rod fixing mechanism 14.

This magnetic rod fixing mechanism 14B comprises a plurality of first magnets 40 (for example, four thereof) that are provided at an area on the ejector plate against which the integral type ejector rod contacts and a plurality of second magnets 41 (for example, four thereof) that are provided at the base end portion of the integral type ejector rod 11B. In the state in which the ejector rod 11B and the ejector plate 12 are attracted together, when the ejector rod 11B is rotated by 90 degree clockwise or counterclockwise, the magnet rod fixing device 14B is changed into a state in which the first and second magnets 40, 41 generate the repulsive force, thereafter the ejector rod 11B is removed from the ejector plate 12. The magnets 40, 41 may be, for example, neodymium magnets.

Furthermore, the engagement holes 45 are provided at the central portions of the base end portions of the ejector rods 11B, and the engagement pins 46 made from a non-magnetic material (for example, stainless steel) are fixedly attached to the ejector plate 12 so as to project rightwards and so as to engage with the engagement holes 45. Thus, the engagement pins 46 are fixed to the ejector plate 12 with a construction that is fundamentally similar to the construction of Embodiment 1 by which the engagement pins 26 were fixed to the tip end portions of the base rods 15.

According to this ejector device 7B, when the dies M on this injection molding machine 1 is to be exchanged, by removing from the ejector plate 12 the ejector rods 11B which, corresponding to the new die, are unnecessary, and by installing one or more newly required ejector rods 11B to the ejector plate 12, from the die fixing surface side 3*a* of the movable platen 3, it becomes possible to exchange the ejector rods 11B in a simple manner so that it is possible greatly to reduce the burden of exchanging the ejector rods 11B. Moreover it is possible to reduce the load on the ejector drive mechanism 4, since it will suffice only to install to the ejector plate 12 those ejector rods 11B that are required.

Moreover, since it is possible to reduce the attracting force of the magnet rod fixing device 14B by rotating the ejector rod 11B by 90 degree from the state in which the ejector rod 11B and the ejector plate 12 are attracted together, accordingly, by rotating the ejector rod 11B, it is possible reliably to remove the ejector rod 11B from the ejector plate 12 in a simple manner from the die fixing surface side 3*a* of the movable platen 3.

Embodiment 4

Figure 18:
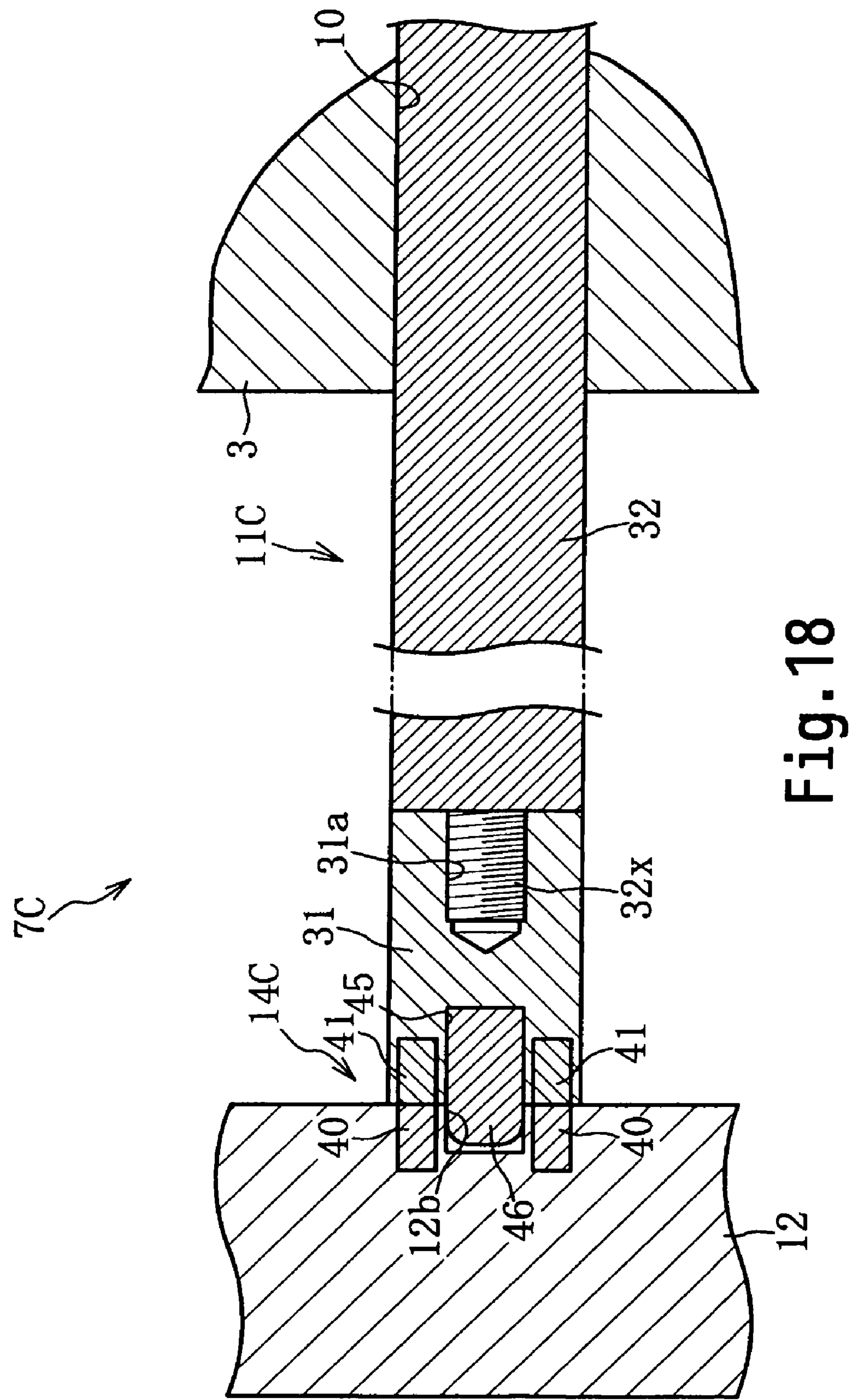
FIG. 18 is a drawing corresponding to FIG. 4, for an injection molding machine of Embodiment 4.
Figure 19:
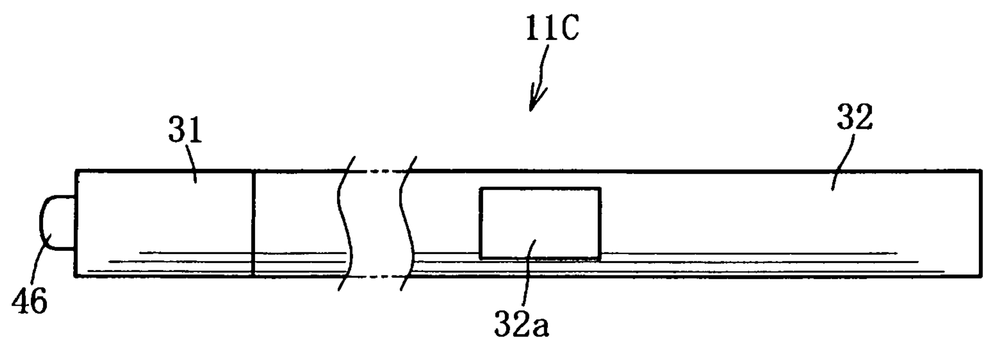
FIG. 19 is a perspective view of an ejector rod.

In the ejector device 7C of this fourth embodiment, the construction of the integrated type ejector rod 11B described in the third embodiment is changed. As shown in FIGS. 18, 19, a plurality of integrated type ejector rods 11C are inserted into a plurality of rod insertion holes 10 so as to slide freely therein. Each of these ejector rods 11C comprises an ejector rod base portion 31 made from a magnetic material (for example, steel) and an ejector rod residual portions 32 that is made from a light metallic material (for example, aluminum) and is fixed to the tip end portion of the ejector rod base portion 31. The length of the ejector rod base portion 31 is made to be quite short predetermined length (for example 50 to 100 mm), in order to lighten the detachable rod 11C.

An axial screwed portion 32*x* of smaller diameter is formed at the base end portion of the ejector rod residual portion 32, and a threaded hole 31*a* is formed in the tip end portion of the ejector rod base portion 31. After adhesive has been applied to the tip end surface of the ejector rod base portion 31 and to the axial screwed portion 32*x*, the ejector rod residual portion 32 is fixed to the ejector rod base portion 31 by screw engagement and adhesion, by the axial screwed portion 32*x* being screwed into the threaded hole 31*a* and thus being engaged thereinto. And a pair of flat portions 32*a* are formed on both sides of the external circumferential portion of the midway of the ejector rod residual portion 32. These flat portions 32*a* correspond to a slippage prevention construction. The ejector plate 12 is also made from a magnetic material (for example, steel).

Furthermore, an engagement hole 12*b* is formed in the ejector plate 12, and an engagement pin 46 made from a non-magnetic material (for example, stainless steel), that can engage into this engagement hole 12*b*, is fixed to the central portion of the base end portion of the ejector rod 11C, so as to project.

Since the greater portions of these ejector rods 11C are made from a light metallic material, accordingly, as compared with the case of making the ejector rods 11C entirely from steel, the working load during exchange of the ejector rods 11C is remarkably alleviated, since the ejector rods 11C are lightened.

Figure 20:
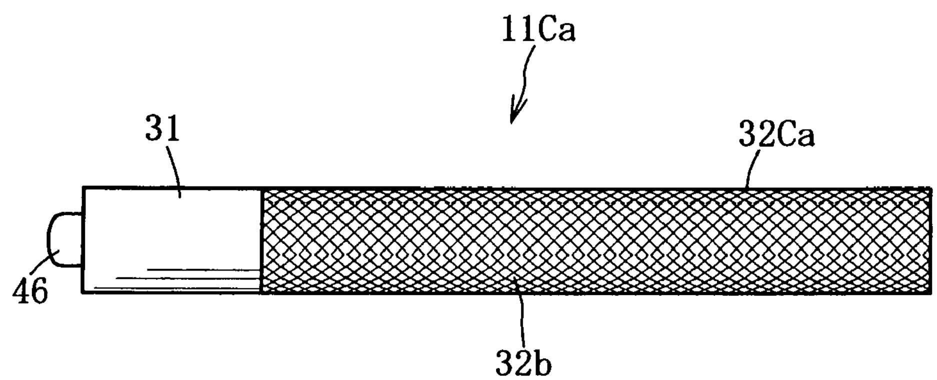
FIG. 20 is an elevation view of a modified ejector rod.
Figure 21:
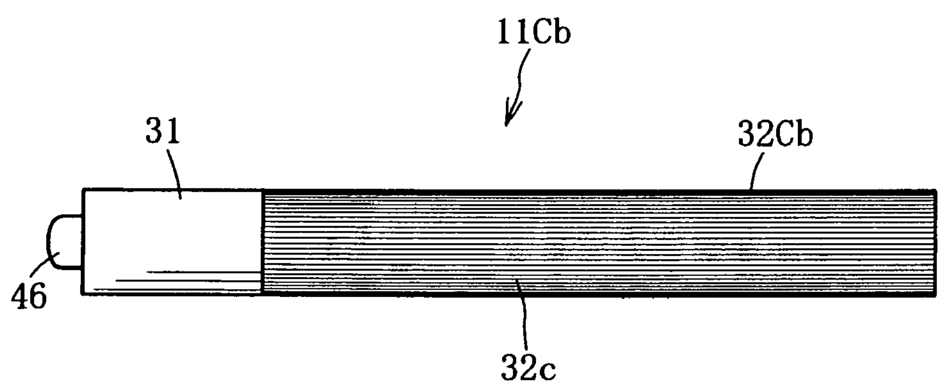
FIG. 21 is an elevation view of a modified ejector rod.

Here, it would also be acceptable to form knurling 32*b* on the outer circumferential surface of the ejector rod residual portion 32Ca of the ejector rod 11Ca, as shown in FIG. 20. This knurling 32*b* would correspond to a slippage prevention construction; and it would also be acceptable to form a plurality of spline grooves 32*c* on the outer circumferential surface of the ejector rod residual portion 32Cb of the ejector rod 11Cb, as shown in FIG. 21. These spline grooves 32*c* would also correspond to a slippage prevention construction. It should be understood that it would also be acceptable to form an engagement hole at the central portion of the base end portion of the ejector rod 11C, and to provide an engagement pin 46 to the ejector plate 12.

Embodiment 5

Figure 22:
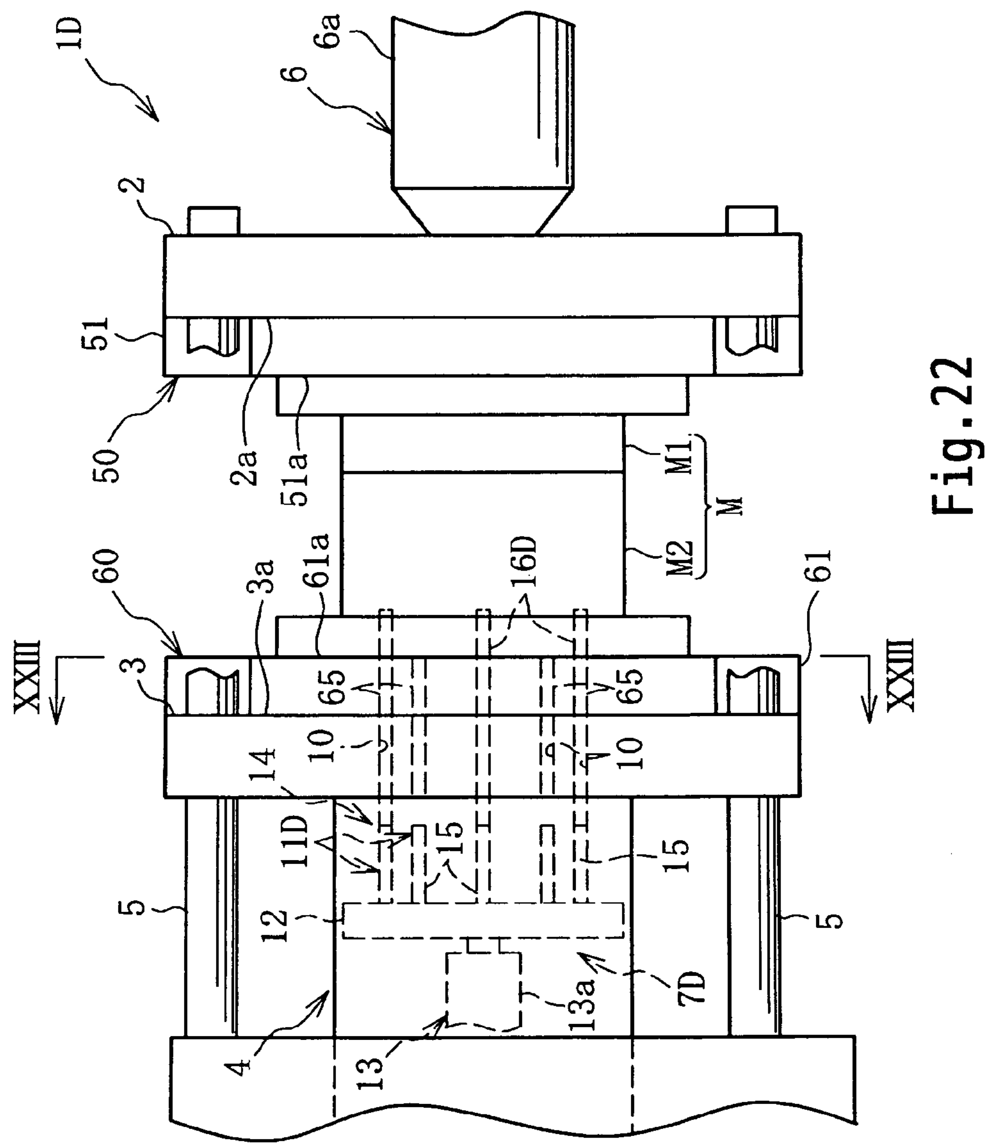
FIG. 22 is a drawing corresponding to FIG. 4, for an injection molding machine of Embodiment 5.
Figure 23:
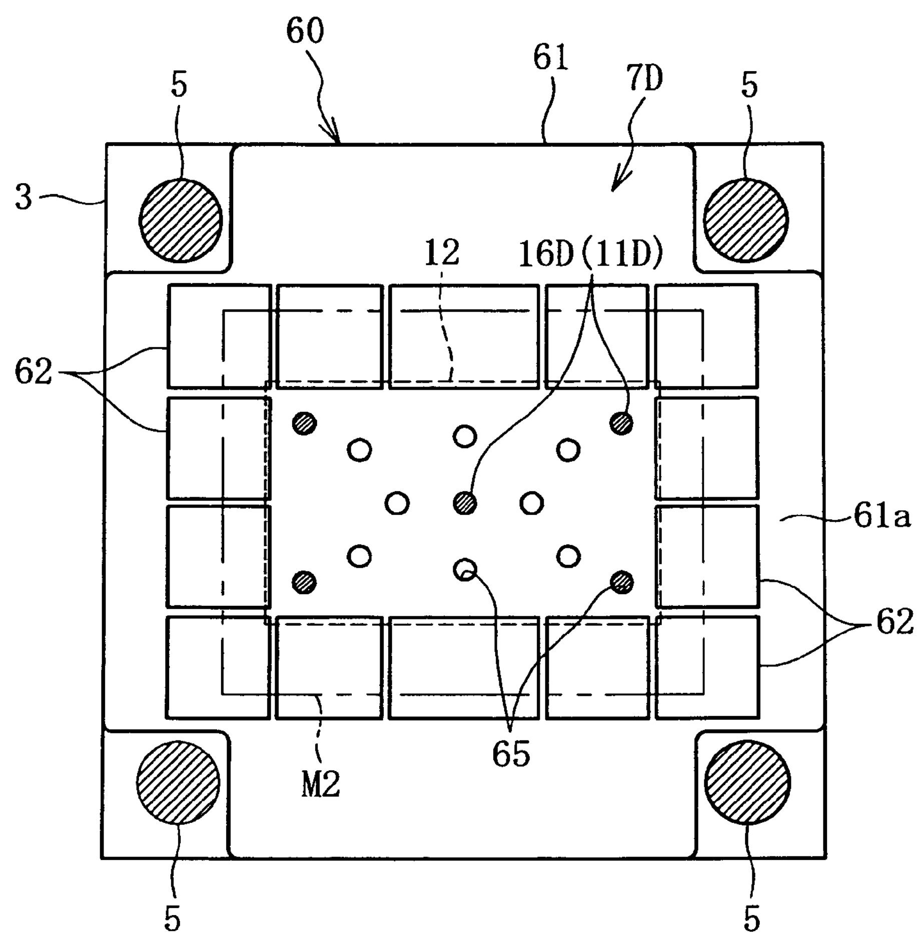
FIG. 23 is a sectional view along XXIII-XXIII line of FIG. 22.
Figure 24:
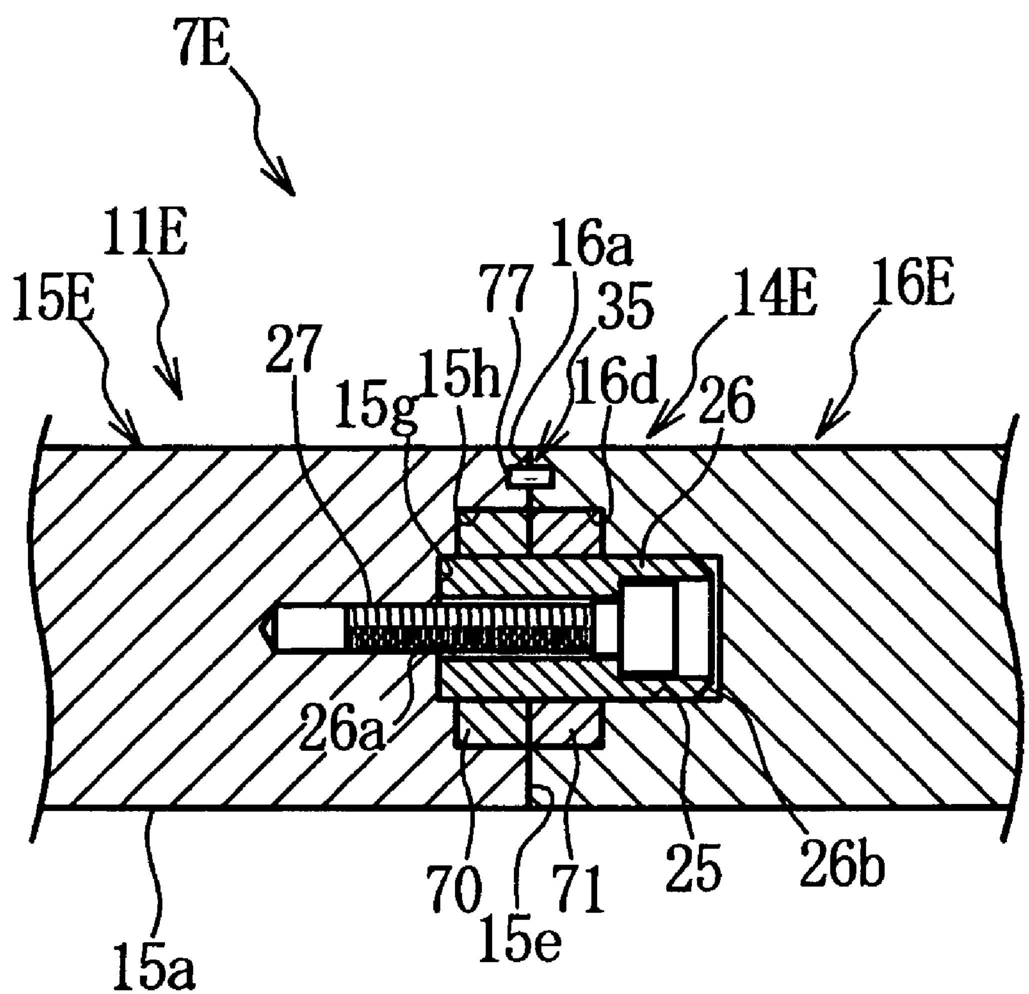
FIG. 24 is a sectional view of a magnetic rod fixing mechanism, for an injection molding machine of Embodiment 6.
Figure 25:
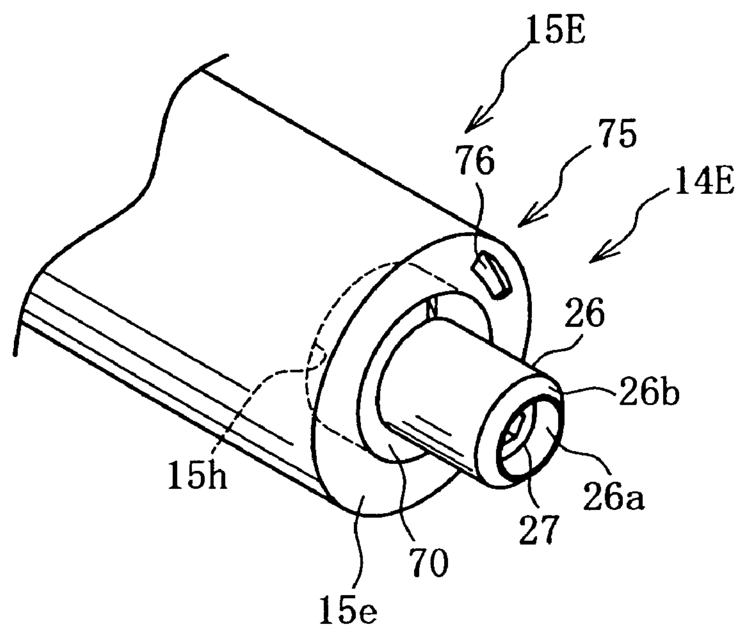
FIG. 25 is a perspective view of the tip end portion of a base rod.
Figure 26:
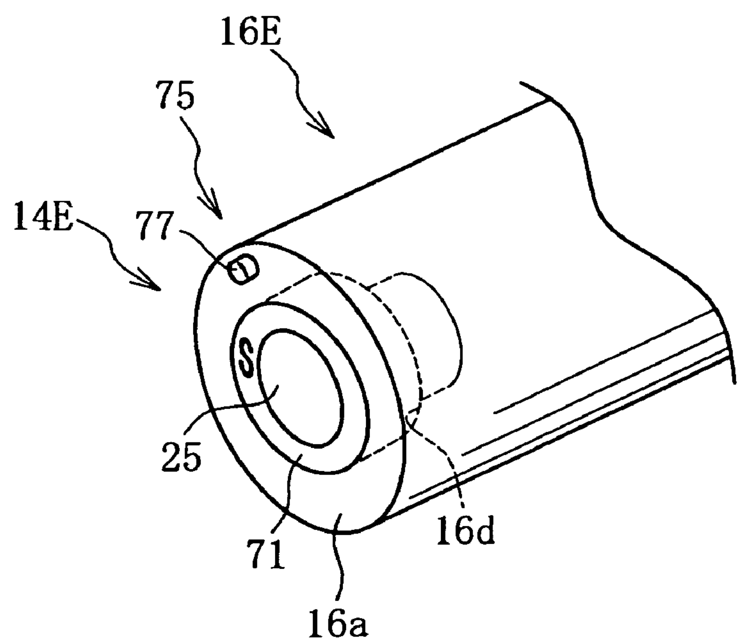
FIG. 26 is a perspective view of the base end portion of a detachable rod.
Figure 27:
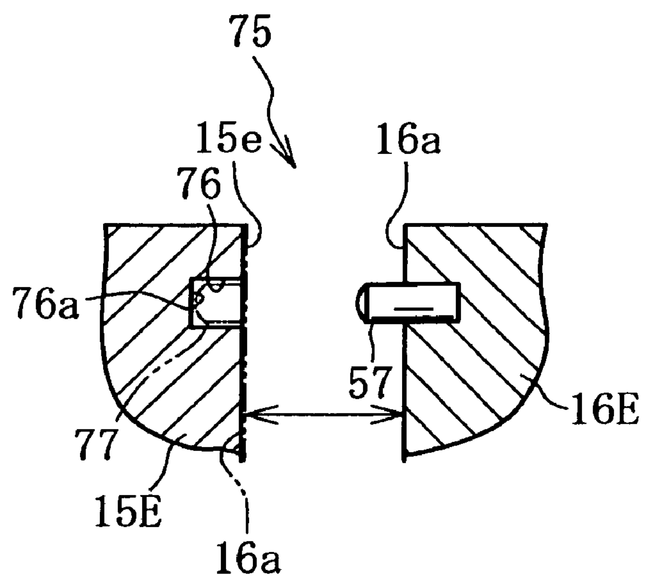
FIG. 27 is a sectional view of an attracting force reducing mechanism.
Figure 28:
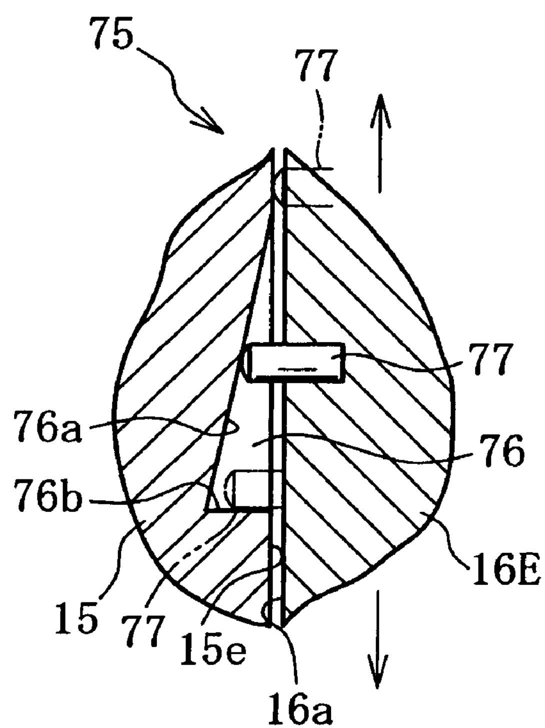
FIG. 28 is a sectional view of the attracting force reducing mechanism.

As shown in FIGS. 22, 23, the injection molding machine 1D of Embodiment 5 comprises a magnetic die fixing device 50 for fixing the fixed die M1 to the fixed platen 2, and a magnetic die fixing device 60 for fixing the movable die M2 to the movable platen 3. The magnetic die fixing device 50 on the fixed platen 2 comprises a clamp plate 51 that is fixed to the die fixing surface 2*a* of the fixed platen 2 and a plurality of magnet units (not shown in Figs.) that are built into the clamp plate 51, and the fixed die M1 is attracted to the clamp plate 51 by the magnetism generated by the plurality of magnet units.

The magnetic die fixing device 60 on the the movable platen 3 comprises a clamp plate 61 that is fixed to the die fixing surface 3*a* of the movable platen 3 and a plurality of magnet units 62 that are built into the clamp plate 61, and the movable die M2 is attracted to the clamp plate 61 by the magnetism generated by the plurality of magnet units 62. The fundamental structure of these magnetic die fixing devices 50, 60 is the same as that described in, for example, Japanese Laid-Open Patent Publication No. 2008-200927 whose applicant is the same as the applicant of the present application, and accordingly explanation thereof is omitted.

In this ejector device 7D, the ejector rods 11D are elongated by the thickness of the clamp plates 51,61 than those of Embodiment 1, and also a plurality of plate side rod insertion holes 65 are provided in the clamp plate 61 so as to communicate respectively with the plurality of rod insertion holes 10. The plurality of magnet units 62 are provided so as not to interfere with the plurality of plate side rod insertion holes 65, for example as shown in FIG. 23. The ejector rods 11D include a plurality of base rods 15 that are similar to those of Embodiment 1, and a plurality of detachable rods 16D whose lengths are longer than those of the detachable rods 16 of Embodiment 1.

Since according to this ejector device 7D the clamp plate 61 that is provided with the plurality of magnet units 62 that attract the movable die M2 by magnetism is fixed to the die fixing surface 3*a* of the movable platen 3, and since the plurality of plate side rod insertion holes 65 are formed in this clamp plate 61 so as to communicate respectively with the plurality of rod insertion holes 10, accordingly it is possible reliably to perform attachment of the movable die M2 to the movable platen 3, and removal thereof therefrom, and with this, similar advantages are obtained to the advantages obtained by the ejector device 7 of Embodiment 1.

Embodiment 6

The ejector device 7E of Embodiment 6 is a version in which the magnetic rod fixing mechanism 14E different from the magnet rod fixing mechanism 14 of Embodiment 1 has been applied to the ejector devices 7, 7A in Embodiment 1, 2 or 5. As shown in FIGS. 24 to 28, this magnetic rod fixing mechanism 14E comprises annular sleeve like third magnets 70 that are provided at the tip end portions of the base rods 15E, and annular sleeve like fourth magnets 71 that are provided at the base end portions of the detachable rods 16E; and there is also provided an attracting force reduction mechanism 75 that reduces the attracting force by rotating the detachable rod 16E with respect to the base rod 15E from the state in which the base end portion of the detachable rod 16E is attracted to the tip end portion of the base rod 15E. The magnets 70, 71 may be, for example, neodymium magnets.

The third and fourth magnets 70, 71 have the same shape, and their inner diameters are approximately the same as the diameter of the engagement pin 26. In the state in which the third magnet 70 is fitted over the outside of the engagement pin 26, it is inserted into and glued into a magnet fitting aperture 15*h* formed in the base rod 15E, so that its tip end surface fronts onto the tip end surface 15*e* of the base rod 15E.

And the fourth magnet 71 is inserted into and glued into a magnet fitting aperture 16*d* formed in the detachable rod 16E, so that its base end surface fronts onto the base end surface 16*a* of the detachable rod 16E, and moreover so that its magnetic polarity is opposite to that of the third magnet 70, with its inner circumferential surface being one with the inner circumferential surface of the engagement hole 25.

The attracting force reduction mechanism 75 comprises a tapered concave groove 76 that is formed in the shape of a circular arc centered on the axis of the base rod 15E, and an engagement pin 77 that is attached to and projects from the base end portion of the detachable rod 16E, so as to engage into the tapered concave groove 76. The tapered concave groove 76 is provided so as to be of comparatively short extent outward of the third magnet 70 in the radial direction. At one end portion of the tapered concave groove 76 in the circumferential direction, the taper surface 76*a* of the tapered concave groove 76 joins to the tip end surface 15*e* of the base rod 15E, and a step portion 76*b* is formed at the other end portion in the circumferential direction of the tapered concave groove portion 76.

With this attracting force reduction mechanism 75, with the engagement pin 77 contained in the vicinity of the step portion 76*b* of the tapered concave groove 76 and the tip end surface 15*e* of the base rod 15E contacted against the base end surface 16*a* of the detachable rod 16E, it is possible to provide reliable attracting with the magnetism of the third and fourth magnets 70, 71. And when, from this state, the detachable rod 16E is rotated in the direction to remove the engagement pin 77 away from the step portion 36*b*, the engagement pin 77 engages to the tapered surface 76*a*, and the rotatory power of the detachable rod 16E is converted into force in the direction to remove the detachable rod 16E from the base rod 15E. In other words, by rotating the detachable rod 16E, it is possible to decrease the sticking force so as to remove it from the base rod 15E.

When fixing the base end portion of the detachable rod 16E to the tip end portion of the base rod 15E, if the engagement pin 77 should contact against the tip end surface 15*e* of the base rod 15E, then it is possible, by rotating the detachable rod 16E from this state, to receive the engagement pin 77 in the tapered concave groove 76 in the vicinity of the step portion 76*b*, and thus to contact together the tip end surface 15*e* of the base rod 15E and the base end surface 16*a* of the detachable rod 16E. In this situation, by rotating the detachable rod 16E in the opposite direction to that which causes the sticking force to be reduced, the engagement pin 77 comes to engage with the step portion 76*b*, and since the further rotation of the detachable rod 16E becomes impossible when this is done, due to this, it is possible to confirm that the tip end surface 15*e* of the base rod 15E and the base end surface 16*a* of the detachable rod 16E have come into contact.

According to this ejector device 7E, the magnetic rod fixing mechanism 14E comprises the third and fourth magnets 70, 71 that are provided both to the tip end portions of the base rods 15E and to the base end portions of the detachable rods 16E, and since the attracting force reduction mechanism 75 is provided with which the attracting force may be reduced by rotation of the detachable rod 16E with respect to the base rod 15E from the state in which the base end of the detachable rod 16E and the tip end of the base rod 15E is attracted together, accordingly the construction of the magnetic rod fixing mechanism 14E is simplified, the base end of the detachable rod 16E are reliably attracted to the tip ends of the base rods 15E, and moreover it is possible to remove the detachable rod 16E from the base rod 15E in a simple manner by rotating it with respect to the base rod 15E.

Additionally, the constitution of engagement holes 25, engagement pins 26 and bolts 27 and the like are same with those of Embodiment 1. Further, the engagement hole 25 can be formed on the base rod 15E, and the engagement pin 26 can be fitted on the detachable rod 16E.

Embodiments 1 to 6 may be modified as follows.

(1) The magnet rod fixing device 14E may be modified partially. The base rod 15E and the the detachable rod 16E are made from magnetic material, only any one of the third and fourth magnets 70, 71 is provided. That is, the detachable rod 16E is fixed to the vase rod 15E by the magnetism of one magnet. In this case, it is better to provide the attracting force reduction mechanism 75. Further, the engagement hole 15 may be formed on the base rod 25, and the engagement pin 26 may be fitted on the detachable rod 16E.

(2) The magnetic rod fixing mechanism 14E and the attracting force reduction mechanism 75 of Embodiment 6 may be applied to the ejector device 7B, 7C of Embodiment 3 and 4. In this case, one of the third and fourth magnets 70, 71 may be omitted, and the ejector rod 11B, 11C may be fixed to the ejector plate 12.

(3) As slippage preventing construction, a rubber lining may be formed on the outer surface of the ejector rod or the detachable rod.

(4) For the ejector driving mechanism, as its actuator, a drive motor may be applied as well as a fluid pressure cylinder, and the actuator may drive the ejector plate 12 via a toggle mechanism or a ball screw mechanism or the like.

(5) Apart from the above, for a person skilled in the art, it is possible to implement various changes to the above embodiments in additional ways without deviating from the gist of the present invention, and the present invention should also be considered as including these types of variant embodiments.

The invention claimed is:

1. An ejector device of a molding machine for ejecting a molded product from a die fixed to a platen of the molding machine, comprising:

- an ejector plate disposed at a rear side of the platen;
- an ejector drive means for driving the ejector plate relatively to the platen in directions to approach towards and to withdraw from the platen;
- a plurality of rod insertion holes formed so as to pierce through the platen;
- a plurality of ejector rods that are inserted into the plurality of rod insertion holes so as to slide freely therein; and
- a plurality of magnetic rod fixing means for removably fixing the plurality of ejector rods to the ejector plate respectively by the magnetism of permanent magnets and for annulling said magnetism by rotating each one of the plurality of ejector rods, respectively around an axis of said respective one of the ejector rods.

2. An ejector device of a molding machine for ejecting a molded product from a die fixed to a platen of the molding machine, by comprising:

- an ejector plate disposed at a rear side of the platen;
- an ejector drive means for driving the ejector plate relatively to the platen in directions to approach towards and to withdraw from the platen;
- a plurality of rod insertion holes formed so as to pierce through the platen;
- a plurality of ejector rods, comprising a plurality of base rods that are inserted into the plurality of rod insertion holes respectively so as to slide freely therein and whose base end portions are fixed to the ejector plate, and a plurality of detachable rods each of which can be fitted to and detached from a tip end portion of one of the plurality of base rods; and a plurality of magnetic rod fixing means for removably fixing each of the plurality of detachable rods to the tip end portion of said one base rod, respectively, by the magnetism of permanent magnets, and for annulling said magnetism by rotating said each of the detachable rods around an axis of said each of the detachable rods.

3. An ejector device of a molding machine according to claim 2, wherein the base end portions of the base rods are engaged to the ejector plate by screw engagement.

4. An ejector device of a molding machine according to claim 2, comprising a clamp plate provided with a plurality of magnet units that attract and hold the die by magnetism and which is fixed to a die fixing surface of the platen, and a plurality of plate side rod insertion holes are formed in the clamp plate, each communicating with one of the plurality of rod insertion holes.

5. An ejector device of a molding machine according to claim 2, wherein when the ejector plate is in an eject position in which it is approached to the platen, the tip end portions of the base rods are positioned within the rod insertion holes.

6. An ejector device of a molding machine according to claim 2, wherein the magnetic rod fixing means comprises:

an even number of first magnets, provided to the tip end portion of the base rod at regular intervals around a circumferential direction, and arranged so that their N poles and S poles at the tip end of the base rod are positioned alternatingly around the circumferential direction; and the same even number of second magnets as the number of first magnets, provided to the base end portion of the detachable rod at regular intervals around a circumferential direction, and arranged so that their N and S poles at the base end of the detachable rod are positioned alternatingly around the circumferential direction.

7. An ejector device of a molding machine according to claim 6, wherein each of first and second magnets is made so that the direction joining the N pole and S pole is parallel to an axis of the ejector rod.

8. An ejector device of a molding machine according to claim 6, wherein the magnetic rod fixing means attracts to hold the base end portion of the detachable rod to the tip end portion of the base rod by making the positions in the circumferential direction of pairs of the first and the second magnets whose magnetic poles are opposite match one another, and is made so that the detachable rod can be removed from the base rod by rotating the detachable rod with respect to the base rod from above describing attracting state, thus taking advantage of the repulsive force of pairs of the first and the second magnets whose magnetic poles are the same.

9. An ejector device of an injection molding machine according to claim 2, wherein the magnetic rod fixing means comprises:

a third magnet provided at the tip end portion of the base rod; and a fourth magnet provided at the base end portion of the detachable rod, and arranged so as to be capable of generating attracting force in cooperation with the third magnet.

10. An ejector device of a molding machine according to claim 9, wherein each of the third and fourth magnets is a sleeve shaped magnet concentric with the ejector rod and having an N pole or a S pole at one end in an axial direction and a S pole or an N pole at the other end in the axial direction.

11. An ejector device of a molding machine according to claim 2, wherein:

the ejector rod is made from a magnetic material; and the magnetic rod fixing means comprises one or a plurality of magnets provided either at the tip end portion of the base rod or at the base end portion of the detachable rod.

12. An ejector device of a molding machine according to claim 9, further comprising an attracting force reduction means that reduces an attracting force by rotating the detachable rod with respect to the base rod from a state in which the base end portion of the detachable rod is attracted to the tip end portion of the base rod.

13. An ejector device of a molding machine according to claim 2, further comprising an engagement hole formed in a central portion of the base end portion of the detachable rod, and an engagement pin, made from a non-magnetic material, and provided at a central portion of the tip end portion of the base rod, so as to project into and engage with the engagement hole.

14. An ejector device of a molding machine according to claim 2, further comprising an engagement hole formed in a central portion of the tip end portion of the base rod, and an engagement pin, made from a non-magnetic material, and provided at a central portion of the base end portion of the detachable rod, so as to project into and engage with the engagement hole.

15. An ejector device of a molding machine according to claim 1, wherein the ejector rod further comprises an ejector rod base portion made from a magnetic material, to a base end portion of which a portion of the magnetic fixing means is installed, and an ejector rod residual portion, made from a light metallic material and fixed to a tip end portion of the ejector rod base portion.

16. An ejector device of a molding machine according to claim 2, wherein the detachable rod further comprises a detachable rod base portion made from a magnetic material, to a base end portion of which a portion of the magnetic fixing means is installed, and a detachable rod residual portion, made from a light metallic material and fixed to a tip end portion of the detachable rod base portion.

17. An ejector device of a molding machine according to claim 15, comprising a slippage prevention construction provided at least at one portion of an outer circumferential surface of the ejector rod residual portion.

18. An ejector device of a molding machine according to claim 16, comprising a slippage prevention construction provided at least at one portion of an outer circumferential surface of the detachable rod residual portion.

* * * * *